US008165112B2

(12) United States Patent
Menon et al.

(10) Patent No.: US 8,165,112 B2
(45) Date of Patent: Apr. 24, 2012

(54) APPARATUS AND METHOD FOR A FAULT-TOLERANT SCALABLE SWITCH FABRIC WITH QUALITY-OF-SERVICE (QOS) SUPPORT

(75) Inventors: Raghavan Menon, Santa Clara, CA (US); Adam Goldstein, San Francisco, CA (US); Mark D. Griswold, Fremont, CA (US); Mitri I. Halabi, San Jose, CA (US); Mohammad K. Issa, Los Altos, CA (US); Amir Lehavot, San Francisco, CA (US); Shaham Parvin, San Jose, CA (US); Xiaoyang Zheng, Fremont, CA (US)

(73) Assignee: Tellabs San Jose, Inc., San Jose, CA (US)

( * ) Notice: Subject to any disclaimer, the term of this patent is extended or adjusted under 35 U.S.C. 154(b) by 47 days.

(21) Appl. No.: 12/368,064

(22) Filed: Feb. 9, 2009

(65) Prior Publication Data

US 2009/0201923 A1    Aug. 13, 2009

Related U.S. Application Data

(63) Continuation of application No. 09/994,592, filed on Nov. 27, 2001, now Pat. No. 7,505,458.

(51) Int. Cl.
*H04L 12/50* (2006.01)
(52) U.S. Cl. ........................................ 370/388
(58) Field of Classification Search .................. 370/401, 370/388, 389, 398, 395, 400, 351, 445, 349; 348/14; 709/203, 205; 455/452
See application file for complete search history.

(56) References Cited

U.S. PATENT DOCUMENTS

| 4,367,549 A | * | 1/1983 | Vachee | 370/304 |
| 4,768,145 A | * | 8/1988 | Wheelwright et al. | 710/113 |
| 4,862,451 A | * | 8/1989 | Closs et al. | 370/353 |

(Continued)

FOREIGN PATENT DOCUMENTS

WO    WO 00/64109    10/2000

OTHER PUBLICATIONS

N. McKeown, "The iSLIP Scheduling Algorithin for Input-Queued Switches", IEEE Transactions on Networking, vol. 7, No. 2, Apr. 1992, 22 pages.

(Continued)

*Primary Examiner* — Hassan Phillips
*Assistant Examiner* — Prenell P Jones
(74) *Attorney, Agent, or Firm* — Fitzpatrick, Cella, Harper & Scinto

(57) ABSTRACT

Embodiments of the present invention relate to portions of a switch fabric having a single logical stage and at least one physical stage. In addition, the data paths and the control paths of the switch fabric can be decoupled thereby allowing additional processing to be performed than would otherwise be the case with control rates that matched the high data rates. In other words, data cells received on high speed links can be spread over many lower speed links; consequently, the data cells can transit the switch fabric at that high speed while the control information associated with the data can be processed at that lower speed. Because the control information can be processed at a lower speed (associated with the control path), the control information can be processed over a greater period of time.

30 Claims, 22 Drawing Sheets

U.S. PATENT DOCUMENTS

| | | | | |
|---|---|---|---|---|
| 4,907,227 A * | 3/1990 | Unno | ................................ | 714/4 |
| 4,914,655 A * | 4/1990 | Johannes et al. | .............. | 370/540 |
| 5,136,585 A * | 8/1992 | Nizamuddin et al. | ......... | 370/271 |
| 5,305,320 A * | 4/1994 | Andrews et al. | .............. | 370/229 |
| 5,317,562 A * | 5/1994 | Nardin et al. | ................. | 370/428 |
| 5,418,952 A * | 5/1995 | Morley et al. | .................... | 712/14 |
| 5,422,885 A * | 6/1995 | Nadkarni | ....................... | 370/451 |
| 5,500,858 A | 3/1996 | McKeown | | |
| 5,583,861 A * | 12/1996 | Holden | .................... | 370/395.42 |
| 5,640,389 A * | 6/1997 | Masaki et al. | ................. | 370/418 |
| 5,654,979 A * | 8/1997 | Levin et al. | .................... | 375/142 |
| 5,771,462 A * | 6/1998 | Olsen | ........................... | 455/524 |
| 5,896,388 A * | 4/1999 | Earnest | ........................ | 370/230.1 |
| 5,923,644 A | 7/1999 | McKeown et al. | | |
| 5,923,650 A * | 7/1999 | Chen et al. | .................... | 370/331 |
| 6,101,599 A | 8/2000 | Wright et al. | | |
| 6,157,957 A | 12/2000 | Berthaud | | |
| 6,219,352 B1 * | 4/2001 | Bonomi et al. | ................ | 370/417 |
| 6,385,198 B1 * | 5/2002 | Ofek et al. | .................... | 370/389 |
| 6,396,867 B1 * | 5/2002 | Tiedemann et al. | .......... | 375/141 |
| 6,567,396 B1 * | 5/2003 | Pohjanvouri et al. | ......... | 370/349 |
| 6,657,983 B1 * | 12/2003 | Surazski et al. | ............... | 370/337 |
| 6,683,848 B1 * | 1/2004 | Parrish | .......................... | 370/218 |
| 6,721,290 B1 * | 4/2004 | Kondylis et al. | .............. | 370/329 |
| 7,603,127 B2 * | 10/2009 | Chung et al. | .................. | 455/453 |
| 2001/0010689 A1 * | 8/2001 | Awater et al. | .................. | 370/344 |
| 2001/0010694 A1 | 8/2001 | Lindsey et al. | | |
| 2001/0016994 A1 * | 8/2001 | Gouldson et al. | .............. | 40/322 |
| 2002/0058502 A1 * | 5/2002 | Stanforth | ....................... | 455/422 |
| 2002/0058504 A1 * | 5/2002 | Stanforth | ....................... | 455/426 |
| 2002/0181455 A1 | 12/2002 | Norman et al. | | |
| 2003/0048792 A1 * | 3/2003 | Xu et al. | ........................ | 370/400 |
| 2003/0061269 A1 * | 3/2003 | Hathaway et al. | ............. | 709/202 |
| 2006/0153147 A1 * | 7/2006 | Chillariga et al. | ............. | 370/337 |

OTHER PUBLICATIONS

N. McKeown et al. "The Tiny Tera: A Packet Switch Core", Hot Interconnects V. Stamford University, Aug. 1996.

K. Y. K. Chang et al., "A 50 Gb/s 32×32 CMOS Crossbar Chip using Asymmetric Serial Links", 1999 Symposium on VLSI Circuits, Digest of Technical papers, 4 pages.

K. Y. K. Chang et al., "A 2 Gb/s Asymmetric Serial Links for High-Bandwidth Packet Switches", Hot Interconnects VI, pp. 171-179, Stanford University, Aug. 1997, 9 pages.

N. Uzun et al., "Ten Terabit Multicast Packet Switch with SRRM Scheduling Algorithm", New Jersey Institute of Technology, pp. 1-10, 1999.

N. McKeown, "Scheduling Algorithms for Input-Queued Cell Switches", pp. 1-119, Ph.D. Thesis, University of California at Berkeley, May 1995.

Ed. by T.G. Robertazzi, "Performance Evaluation of High Speed Switching Fabrics and Networks: ATM, Broadband ISDN, and MAN Technology", IEEE Press, ISBN 0-7803-0436-5, pp. 1-467.

C. Rose et al., "The Performance of Random and Optimal Scheduling in a Time Multiplex Switch," IEEE Transactions on Communications, vol. COM-35, No. 8, Aug. 1987, pp. 813-817.

T. Anderson, et al. "High Speed Switch Scheduling for Local-Area Networks," ACM Transactions on Computer Systems, vol. 11, No. 4, Nov. 1993, pp. 319-352.

\* cited by examiner

& # x20;
APPARATUS AND METHOD FOR A FAULT-TOLERANT SCALABLE SWITCH FABRIC WITH QUALITY-OF-SERVICE (QOS) SUPPORT

This application is a continuation of U.S. application Ser. No. 09/994,592, filed Nov. 27, 2001.

BACKGROUND OF THE INVENTION

The present invention generally relates to telecommunication switching. More specifically, the present invention relates to a scalable switch fabric with quality-of-service (QoS) support.

Switch fabrics exists having a crossbar switch are known. Such crossbar switches typically use input queues and a centralized scheduler for configuring the crossbar. When a cell arrives at the switch fabric, it is placed in an input queue where it waits its turn to be transferred across the crossbar of the switch fabric. Thus, the centralized scheduler processes and schedules cells as they arrive at the switching fabric.

Such a known system, however, suffers the shortcoming that the rate at which received data needs to be processed corresponds to the rate at which the data is received. Said another way, the control path by which the data is processed has the same requirements as the data path by which the data is routed. Thus, the time available to process the data within the switching system is limited, particularly for higher switching speeds (i.e., higher throughput).

SUMMARY OF THE INVENTION

Embodiments of the present invention relate to portions of a switch fabric having a single logical stage and at least one physical stage. In addition, the data paths and the control paths of the switch fabric can be decoupled thereby allowing additional processing to be performed than would otherwise be the case with control rates that matched the high data rates. In other words, data cells received on high speed links can be spread over many lower speed links; consequently, the data cells can transit the switch fabric at that high speed while the control information associated with the data can be processed at that lower speed. Because the control information can be processed at a lower speed (associated with the control path), the control information can be processed over a greater period of time.

DETAILED DESCRIPTION

Figure 1:
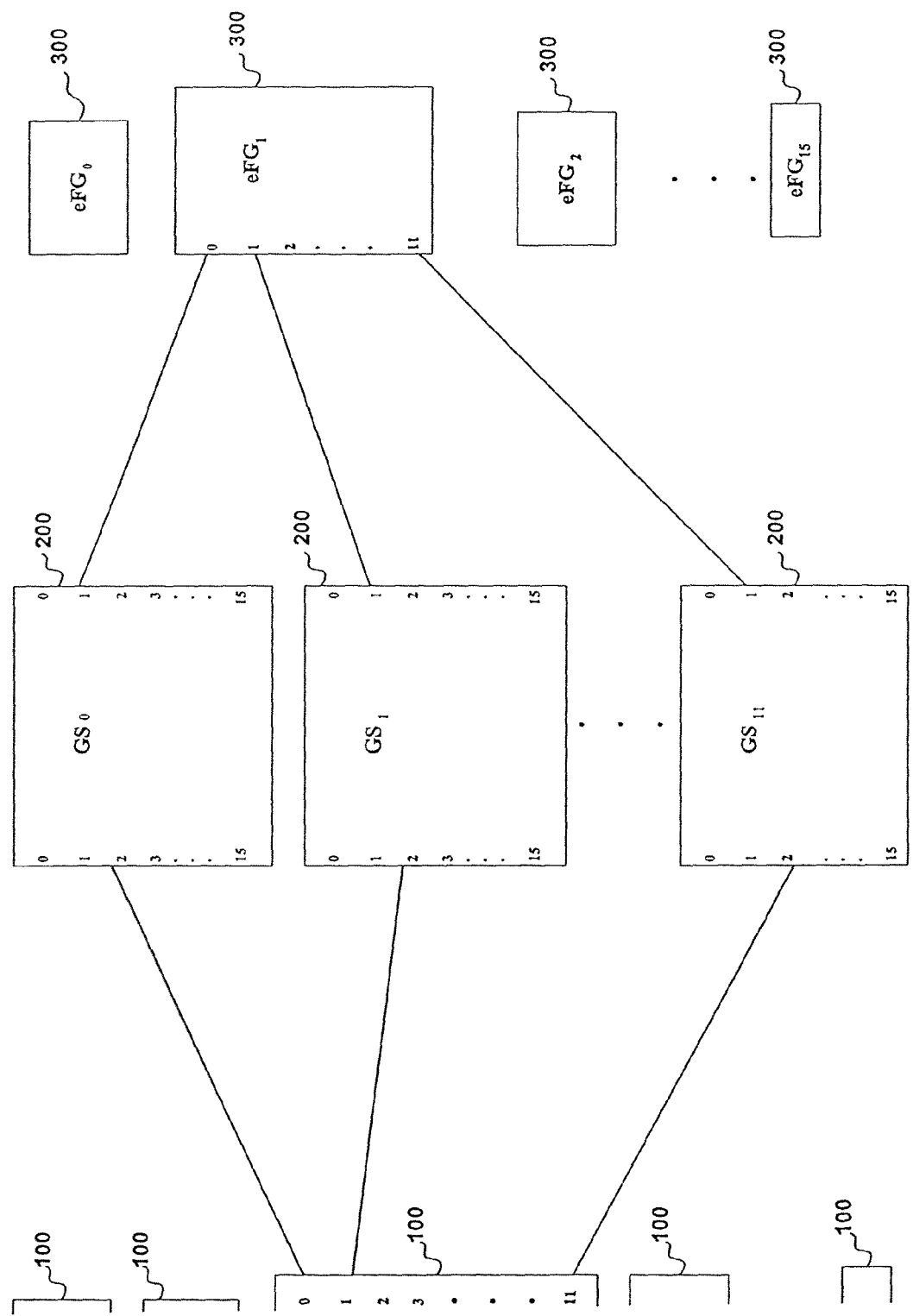
FIG. 1 illustrates a system block diagram of a portion of a switch fabric for a telecommunications switch, according to an embodiment of the present invention.

Embodiments of the present invention relate to portions of a switch fabric having a single logical stage and at least one physical stage. For example, the switch fabric can include a set of fabric gateways (FGs), a set of switching elements (GSs) and/or a set of multiplexer/demultiplexers (MDs), where the single logical stage is the set of GSs which is the only stage that performs arbitration. Each of FGs, GSs and MDs can be embodied by separate application-specific integrated circuits (ASICs), which can be interconnected to form various configurations having, for example, different switch throughputs and different number of links.

In embodiments of the present invention, the data paths and the control paths of the switch fabric are decoupled thereby allowing additional processing to be performed than would otherwise be the case with control rates that matched the high data rates. In other words, data cells received on high speed links can be spread over many lower speed links; consequently, the data cells can transit the switch fabric at that high speed while the control information associated with the data can be processed at that lower speed. Because the control information can be processed at a lower speed (associated with the control path), the control information can be processed over a greater period of time. This greater period of time for processing allows the control information associated with the data cells to be processed in a more complex manner than would otherwise be the case.

For example, in one embodiment, the switch fabric throughput can be 2.56 Tb/s where the switch fabric includes a set of 10 Gb/s links that interconnect the components of some physical stages of the switch fabric. In this embodiment, line cards are each coupled to one of 256 ingress FGs (iFGs). The 256 iFGs are coupled to 192 ingress MDs (iMDs), which are in turn coupled to 192 GSs. The 192 GSs are coupled to 192 egress MDs (eMDs), which are, in turn, coupled to 256 egress FGs (eFGs). Data received at an iFG can be randomly sent to a connected iMD; the iMD can then distribute all received data for a given time slot across multiple connected GS. Thus, it is possible that data received at any given iFG can transit through the switch fabric via any GS.

In sum, data received over one link can be routed over 180 possible paths through the switch fabric in this embodiment. Therefore, data received at a high rate can transit the switch fabric at that high rate while allowing the associated control information to be processed over a time period that is greater (e.g., 180 times greater) than if the control path matched the data path.

The actual path by which data cells transit the switch fabric is determined before those data cells leave the iFGs. More specifically, as data is received at an iFG, a request-to-send (RTS) is generated based on the received data and that RTS is associated with an unrelated data cell; that data cell and the associated RTS are sent from the iFG to a GS. The GS removes the RTS and performing arbitration with other RTS received at that GS. (In some embodiments, multiple RTSs can be associated with a given unrelated data cell.) When a request is granted, a clear-to-sent (CTS) is returned to the iFG from which the RTS originated. This CTS guarantees that a path through the switch fabric will be available for the associated data cell to transit the switch fabric during the appropriate time slots (e.g., a consecutive time slot for each consecutive physical switch stage).

Note that the processing performed at the GSs (e.g., arbitration) is performed in a decentralized manner; in other words, each GS need not maintain state information about each iFG, but rather can use the state information for each RTS received at that particular GS and received from each iFG within a particular period of time. In addition, note that as a data cell transits the switch fabric (after a CTS has been received at an iFG), a substantial delay while routing does not occur because the MDs do not perform arbitration and extensive buffering is not required. In face, the amount of delay while routing is approximately the time associated with a few cells (due to the MDs) and the time associated with one frame (due to the GSs).

Also note that many additional features relating to the embodiments of the switch fabric exist, including features that specifically relate to the FGs, MDs, GSs and to the interaction between those components at the overall switch level. The following discusses the overall system in conjunction with many of these features at the individual chip level.

FIG. 1 illustrates a system block diagram of a portion of a switch fabric for a telecommunications switch, according to an embodiment of the present invention. Ingress fabric gateways (iFGs) 100 are coupled to switching elements (GS) 200, which are in turn coupled to egress fabric gateways (eFGs) 300. In the portion of the switch fabric shown in FIG. 1, sixteen $iFG_x$ 100 are connected to twelve GSs 200, which are connected to sixteen $eFG_x$ 300 (where x designates a particular FG). Only a subset of the connections are shown in FIG. 1 for illustrated purposes; of course, all of the iFGs 100 are connected to GSs 200, which are in turn connected to all of the eFGs 300. Note that a given $iFG_x$ and $eFG_x$ are typically co-located on the same chip; in such a configuration, the ingress and egress paths are the same.

In the embodiment illustrated in FIG. 1, each iFG 100 includes twelve output links labeled 0 through 11 (see, for example, $iFG_2$ shown in FIG. 1). Each GS 200 includes sixteen input links labeled 0 through 15 and sixteen output links labeled 0 through 15. Each eFG 300 includes twelve input links labeled 0 through 11 (see, for example, $eFG_1$ shown in FIG. 1). Although not shown explicitly in FIG. 1, the iFGs 100 each have an input port that couples the iFG 100 to the appropriate component(s) on a source line card (not shown). Similarly, the eFGs 300 each have an output port that couples the eFG 300 to the appropriate component(s) on a destination line card (not shown).

As illustrated in FIG. 1, each iFG 100 can be coupled to each GS 200. For example, $iFG_2$ has twelve output links labeled 0 through 11, where each output link is connected to an input link of a different GS 100. More specifically, as shown in FIG. 1, the output link 0 of $iFG_2$ is connected to input link 2 of $GS_0$. Similarly, output link 1 of $iFG_2$ is connected to input link 2 of $GS_1$. The remaining output links of $iFG_2$ are similarly connected to the remaining GSs 200 including the remaining connection illustrated in FIG. 1 where output link 11 of $iFG_2$ is connected to input link 2 of $GS_{11}$. Again, although FIG. 1 only illustrates the connections associated with $iFG_2$, the remaining iFGs 100 are similarly connected to GSs 200. Said another way, each iFG 100 is connected to each GS 200 in a manner where the output link number of an iFG 100 corresponds to the GS-identifying number (e.g., the output link 0 of the various iFGs 100 are connected to $GS_0$). The iFG-identifying number corresponds to the input link number of the connected GSs 200 (e.g., the iFG-identifying number 2 for $iFG_2$ corresponds to input link 2 of the various GSs 200).

The GSs 200 are coupled to the eFGs 300 in a manner similar to that described in reference to the iFGs 100. More specifically, each GS 200 is coupled to each eFG 300. For example, as illustrated in FIG. 1, output link 1 of $GS_0$ is connected to input link 0 of $eFG_1$, output link 1 of $GS_1$ is connected to input link of $eFG_1$, and so on to the remaining connection shown in FIG. 1 where output link 1 of $GS_{11}$ is connected to input link 11 of $eFG_1$. In other words, the output link number of the GS 200 corresponds to the eFG-identifying number, and the GS-identifying number corresponds to the input link number of the associated eFG 300. In this manner, all of the GSs 200 are coupled to the eFGs 300.

Note that the connection arrangement described in reference to FIG. 1 is merely one embodiment of many possible connection arrangements. For example, other embodiments can connect the iFGs to the GSs so that the input link numbers do not correspond to the identifying number of the GSs. In such an embodiment, the specific relationships between the identifying numbers and link numbers need not match although each output link of an iFG can be coupled to a different GS, and each output link of a GS can be coupled to a different eFG.

Figure 2:
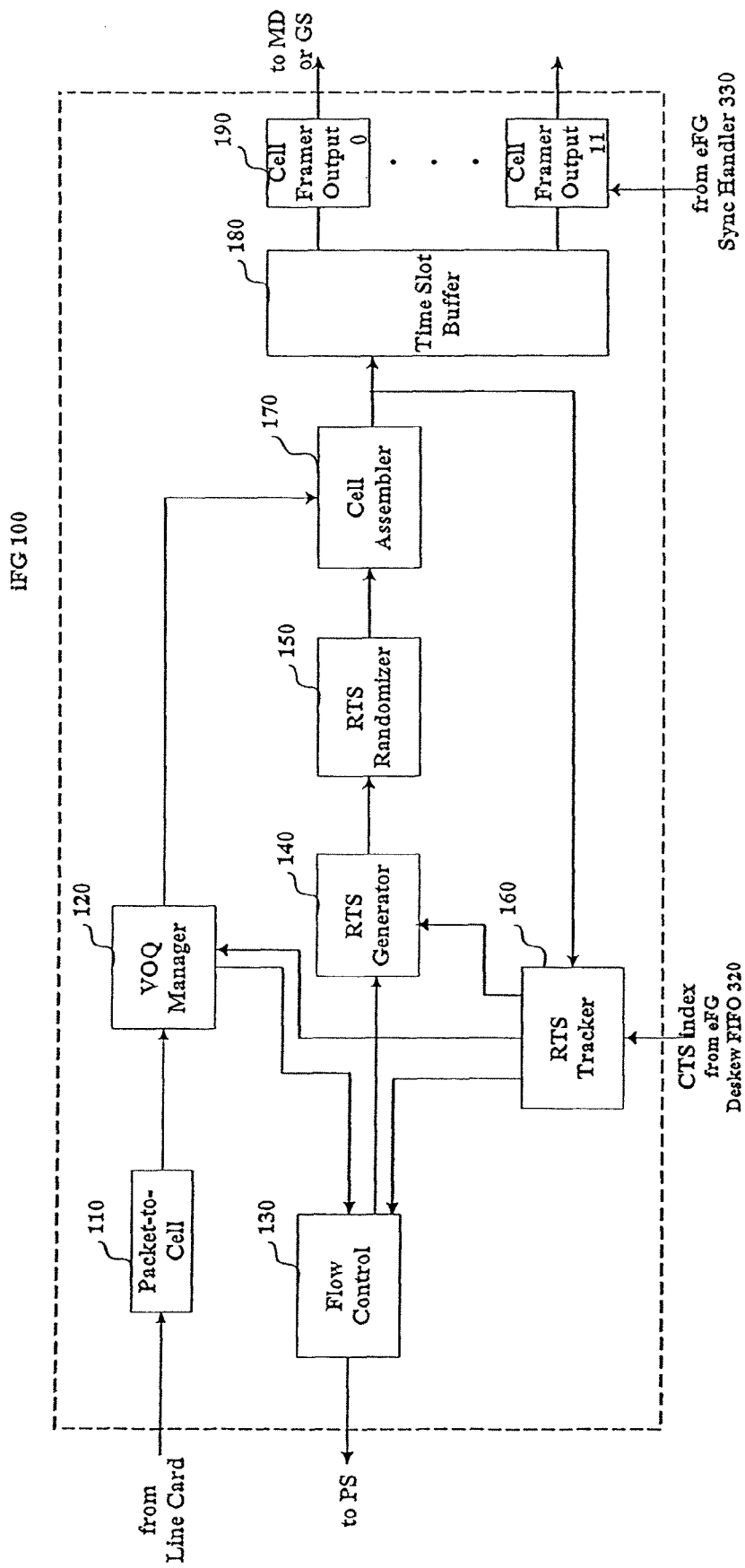
FIG. 2 illustrates a system block diagram of an ingress fabric gateway (iFG), according to an embodiment of the present invention.

FIG. 2 illustrates a system block diagram of an iFG 100, according to an embodiment of the present invention. An iFG 100 includes packet-to-cell 110, which is connected to virtual output queue (VOQ) manager 120, which is connected to flow control 130 and cell assembler 170. Packet-to-cell 110 receives packets from a line card (not shown in FIG. 2), which is typically associated with multiple iFGs 100. Flow control 130 is connected to packet scheduler (PS) (not shown in FIG. 2), which is also typically located on the same line card with the associated iFGs. Flow control 130 is also connected to request-to-send (RTS) generator 140, which is connected to RTS randomizer 150, which in turn is also connected to cell assembler 170. Cell assembler 170 is connected to time slot buffer 180 and RTS tracker 160. RTS tracker 160 receives clear-to-sends (CTSs), for example, from GSs 200; RTS tracker 160 is also coupled to flow control 130 and VOQ manager 120. Time slot buffer 180 is coupled to cell framers 190. Cell framers 190 include multiple separate cell framers, for example twelve separate cell framers labeled cell framer 0 through cell framer 11. Each cell framer 190 corresponds to one of the twelve output links of iFG 100. For example, cell framer 0 can correspond to output link 0 of iFG 100, cell framer 1 can correspond to output link 1 of iFG 100, etc.

Figure 3:
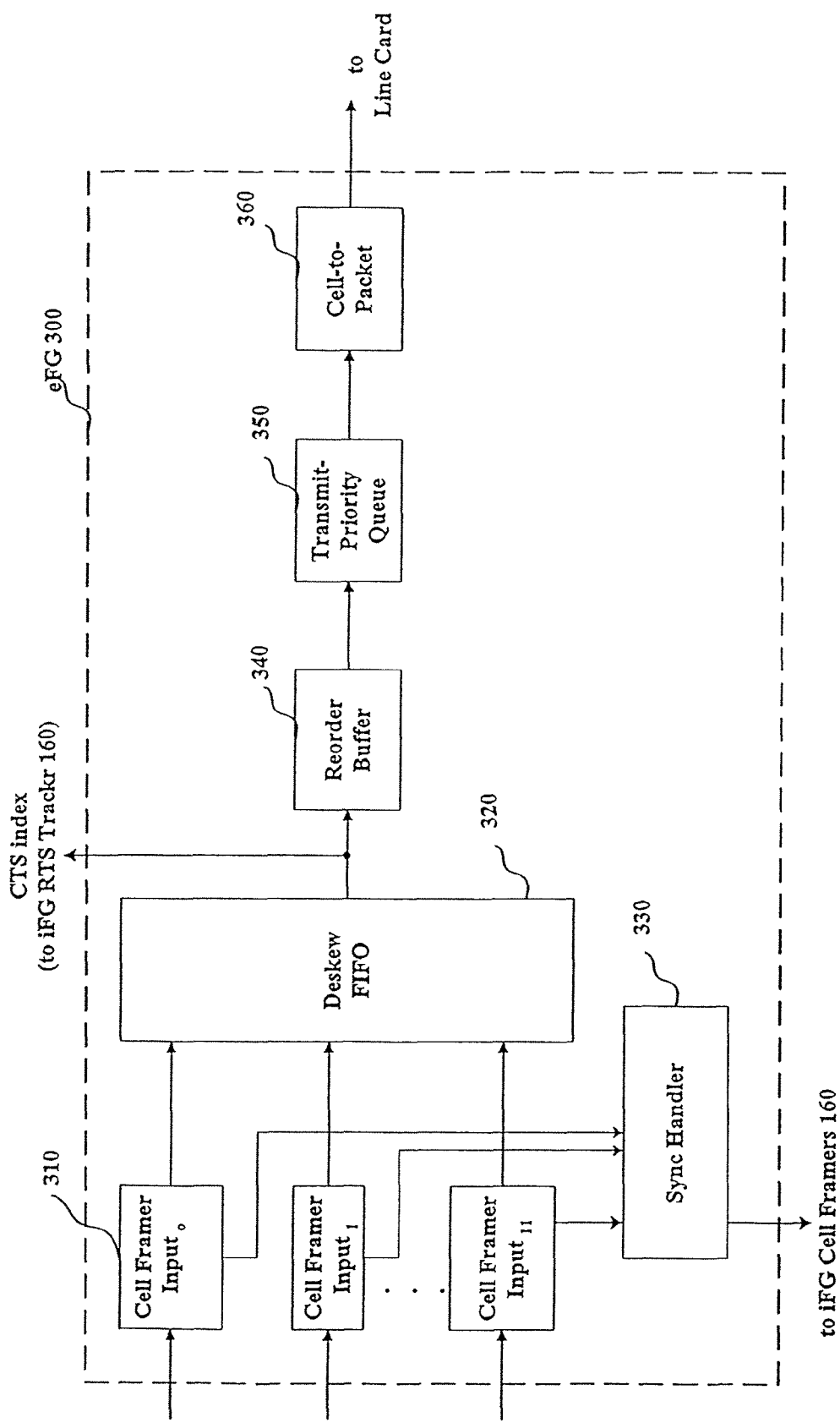
FIG. 3 illustrates a system block diagram of an egress fabric gateway (eFG), according to an embodiment of the present invention.

FIG. 3 illustrates a system block diagram of eFG 300, according to an embodiment of the present invention. An eFG 300 includes cell framer inputs 310 each of which are connected to deskew FIFO (first in, first out) 320 and synch handler 330. Synch handler 330 is also connected to the iFG cell framers 160. Deskew FIFO 320 is connected to reorder buffer 340, which is in turn connected to transmit priority queue 350, which is in turn connected to cell-to-packet 360.

Note that although the iFGs and eFGs are illustrated in FIG. 1, for example, as being physically separate from each other, they can be physically co-located so that signals can be easily transferred between an iFG and its corresponding eFG. For example, iFG$_0$ and eFG$_0$ can typically be located together on the same chip. In such an example, a signal from synch handler 330 of an eFG 300 can be provided to each cell framer 160 of an iFG 100.

Figure 4:
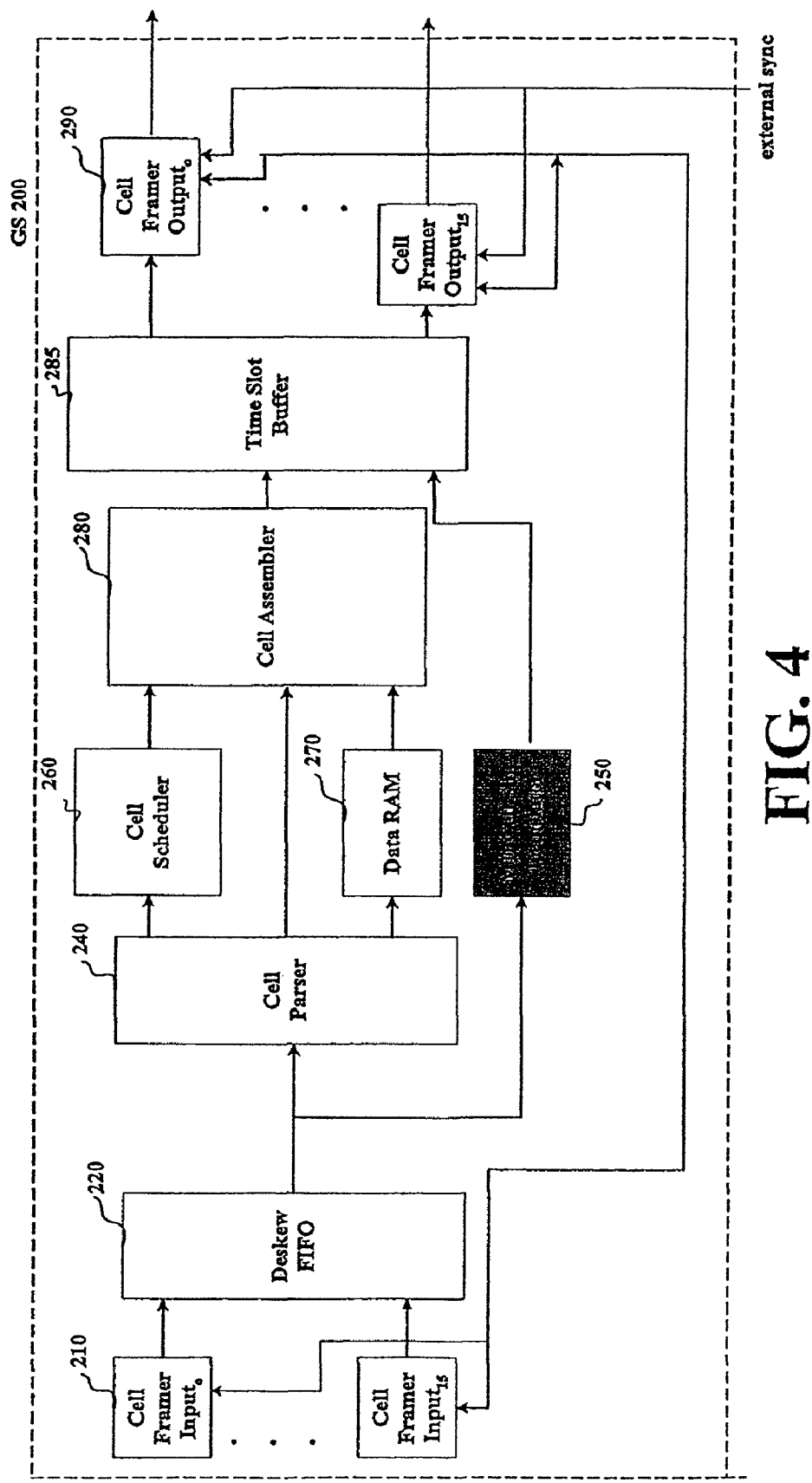
FIG. 4 illustrates a system block diagram for a switching element (GS), according to an embodiment of the present invention.

FIG. 4 illustrates a system block diagram for a GS 200, according to an embodiment of the present invention. A GS 200 includes sixteen cell framer inputs 210 labeled 0 through 15. Cell framer inputs 210 are connected to deskew FIFO 220. Deskew FIFO 220 is coupled to cell parser 240 and MD cell slot translator 250. Cell parser 240 is coupled to cell scheduler 260, data RAM 270 and cell assembler 280. Cell scheduler 260 and data RAM 270 are also connected to cell assembler 280. Cell assembler 280 is connected to time-slot engine 285; MD cell slot translator 250 is also connected to time-slot engine 285. Time-slot engine 285 is coupled to cell framer outputs 290 labeled 0 through 15.

The sixteen cell framer outputs 210 correspond to input links 0 through 15 of GS 200, and the sixteen cell framer outputs 290 correspond to output links 0 through 15 of GS 200. Cell framer outputs 290 each also receive an external synch.

Although described collectively as GS 200, note that the system shown in FIG. 4 has two different possible configurations, only one of which is a GS 200. The system described in reference to FIG. 4 can be configured as a GS 200 when the non-shaded components shown in FIG. 4 are enabled and the shaded components are disabled. More specifically, when configured as a GS 200, the following components are enabled specifically: cell parser 200, cell scheduler 260, data RAM 270 and cell assembler 280; and the MD cell slot translator 250 is disabled.

Figure 5:
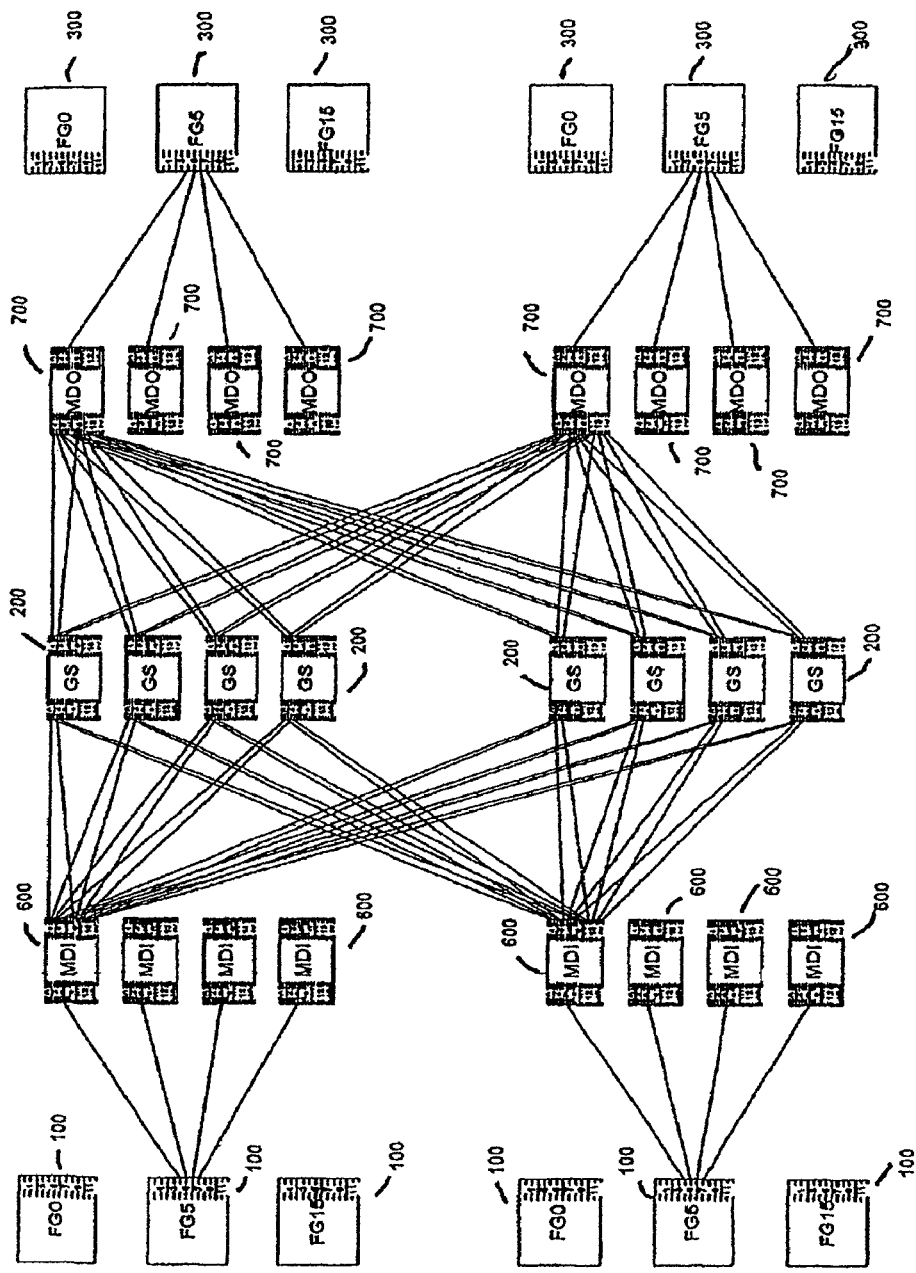
FIG. 5 illustrates a system block diagram of a portion of a switch, according to an alternative embodiment of the present invention.
Figure 6:
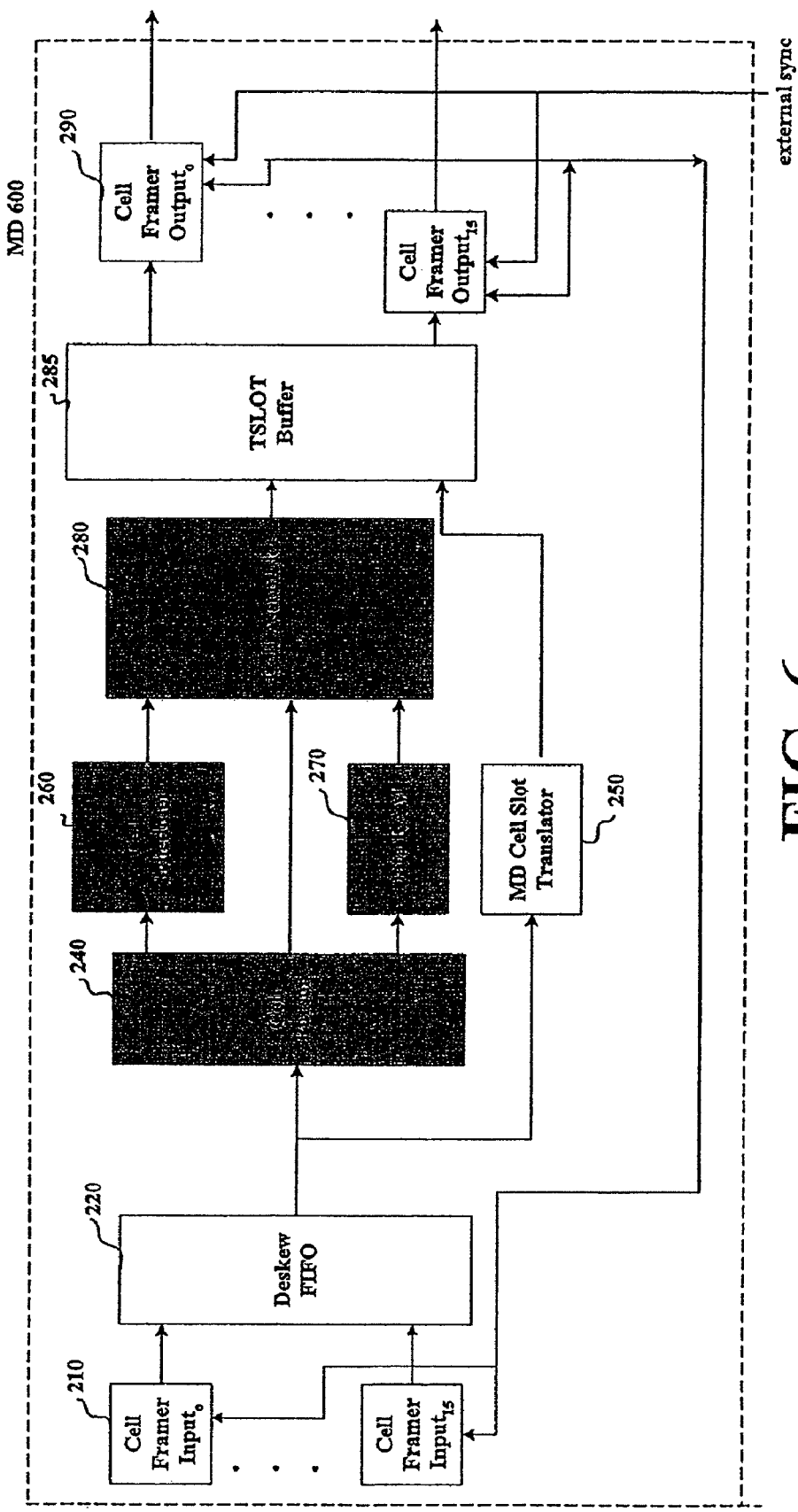
FIG. 6 illustrates a system block diagram for a multiplexer/demultiplexer (MD), according to an embodiment of the present invention.

Alternatively, the system shown in FIG. 4 can be configured as a multiplexer-demultiplexer (MD) as described in reference to FIG. 6. The MD configuration relates to embodiments of the switch fabric having higher switching rates and is used in combination with FGs and GSs, an example of which is shown in FIG. 5.

FIG. 5 illustrates a system block diagram of a portion of a switch, according to an alternative embodiment of the present invention. The switch fabric shown in FIG. 5 has a higher throughput than that of the switch fabric shown in FIG. 1. For example, the switch fabric shown in FIG. 1 can have, for example, a 160 Gb/s throughput while the switch fabric shown in FIG. 5 can have, for example, a 320 Gb/s throughput. In the embodiment shown in FIG. 5, iFGs 100 are connected to iMDs 600, which are in turn connected to GSs 200. GS 200s are connected to eMDs 700, which are in turn connected to eFGs 300. In yet other embodiments (discussed in greater detail below), the switch fabric has 256 iFGs 100, 192 iMD 600, 192 GSs 200, 192 eMDs 700 and 256 eFGs 300. FIG. 5 and other embodiments are mentioned briefly here at a high level and will be discussed in greater detail after a discussion of the MD components and switch fabric operation.

FIG. 6 illustrates a system block diagram for a MD, according to an embodiment of the present invention. The MD system block diagram shown in FIG. 6 is similar to the system block diagram of the GS shown in FIG. 4.

The iMD 600 (and eMD 700) and the GS 200 differ in that the deactivated components of the GS 200 are activated for the iMD 600 (or eMD 700) and some of the activated components of the GS 200 are deactivated for the iMD 600 (or eMD 700). More particularly, while configured as an iMD 600 (or eMD 700), the following components are disabled: cell parser 240, cell scheduler 260, data RAM 270 and cell assembler 280 (shaded in FIG. 6); and the following component (previously shown disabled) is enabled: MD cell slot translator 250 (without shading in FIG. 6).

The cells received at an iMD 600 from connected iFGs 100 have their cell positions within a frame translated before being forwarded to connected GSs 200. This translation is performed by MD cell slot translator 250, which receives the cells from deskew FIFO 220 and translates the cells position within their various slots. This translation allows cells received from a particular iFG 100 to be spread among different GS 200s that are connected to the particular iMD 600. This allows each connected GS 200 to receive cells from more iFGs 100. Said another way, cells that are received on a particular output link of iMD 600 from an iFG 100 can be sprayed across multiple GSs 200.

Returning to embodiment described in reference to FIGS. 1 to 4, the following provides a brief description of the operation of the switch fabric. As packets are received at the iFGs 100, the packets are converted to cells with associated request-to-sends (RTSs). Each RTS is sent to the appropriate GS according to the connections between the iFGs 100 and the GSs 200. Each GS 200 groups together the RTSs received at each respective input link and then performs arbitration of the grouped RTSs. As RTSs are granted through the arbitration process at each GS 200, clear-to-sends (CTSs) are sent from the GSs 200 to the appropriate iFGs 100 thereby allowing the data payload of the corresponding cells to be sent subsequently from the iFGs 100 to the appropriate GSs 200 and through to the appropriate eFGs 300.

Note that although the switch fabric can have a single physical stage or multiple physical stages (depending upon the configuration), the switch fabric has only a single logical stage. More specifically, the configuration of the switch fabric shown in FIG. 1 has a single physical stage (i.e., the GSs 200) and a single logical stage (i.e., the GSs 200). Configurations that include the MDs have multiple physical stages and a single logical stage (see, for example, FIG. 5, which has three physical stages: iMDs, GSs and eMDs, described below in more detail). More specifically, arbitration is perform only at the GS 200 stage while the remaining stages, for example, the iMDs and eMDs described above in connection with FIG. 6, route the RTSs, CTSs and associated cell payloads without performing arbitration. The iFGs 100 and eFGs 300 are not considered physical stages.

Returning to FIG. 2, as packets are received by the various iFGs 100, the packets are converted to cells (e.g., having a uniform data payload size) by packet-to-cell 110 of each iFGs 100. More specifically, the packet-to-cell 110 can convert each received transaction from the line card into, for example, fixed size cells of 64 bytes and a few bytes of control information. The packet-to-cell 110 can also perform error checking on the line card, insert a cell sequence number into the header of each cell to ensure data integrity, and perform buffering to absorb short bursts of cells. Thus, the cells produced from packet-to-cell 110 can each have, for example, a uniform payload with additional bits (e.g., error-checking bits), a destination identification number (e.g., a destination line card identifier) and a priority value (described below in reference to priority-based routing).

The cells are provided to VOQ manager 120 from packet-to-cell 110. The VOQ manager 120 maintains a linked list to manage multiple virtual output queues. The VOQ manager 120 includes a cell payload memory (not shown) and a VOQ queue link table (not shown). The payload for each cell received at VOQ manager 120 can be stored in a cell payload memory and the header for each cell can be stored in a VOQ queue link table. As described below in reference to the cell assembler 170, the stored cell payload memory and the stored cell header can be provided to cell assembler 170 for assembly of cells with associated RTSs.

RTS generator 140 generates RTSs corresponding to the cells generated at packet-to-cell 110; information relating to these cells are provided from packet-to-cell 110 to flow control 130, which in turn forwards the information to RTS generator 140. RTS generator 140 also receives RTS time-out information from RTS tracker 160, which determines when a predetermined amount of time has elapsed from an RTS being sent from an iFG 100 to a GS 200 without receiving back a corresponding CTS. In such a case, that RTS will have timed out and another RTS will need to be generated by RTS generator 140.

RTS generator 140 generates RTSs based on the information received from flow control 130 and RTS tracker 160. RTS tracker 160 can provide information relating to previously sent RTSs for each of which a time out has occurred. For such expired RTSs, a CTS was not granted (via the arbitration process performed by a GS 200); at this point, the cell payload from the corresponding VOQ will not be routed from the corresponding iFG 100 unless RTS generator 140 generates a duplicate RTS for subsequent arbitration.

The RTSs generated by RTS generator 140 can each include, for example, a destination identifier and a priority identifier. The destination identifier can indicate to which eFG 300 the request of the RTS relates. In other words, the destination identifier can indicate to which eFG 300 a cell payload from the VOQ associated with that RTS is to be routed (through a randomly selected GS 200 as discussed below). Said another way, an RTS is associated with a particular VOQ that buffers one or more cell payloads; the destination identifier of the RTS indicates to which eFG 300 a cell payload is to be routed.

The priority identifier for an RTS can be determined based on CTSs (received from cell framer inputs 310), RTSs (received from flow control 130) and denied (or timed-out) RTSs (received from RTS tracker 160. The priority identifier can have, for example, values between 0 and 4 (referred to herein as "P0" through "P4") and can be associated, for example, with a new RTS or a timed-out RTS. In such an example, the priority order (descending) can be as follows: new P0, timed-out P0, new P1, timed-out P1, new P2, timed-out P2, new P3, timed-out P3, new P4 and timed-out P4.

RTS generator 140 determines which RTSs to generate from the various RTSs that need to be generated given the fact that the number of RTSs that need to be generated may exceed the number of slots available for RTSs within a given time slot. For example, RTS generator 140 can generate RTSs that have a higher priority first, then RTSs having a lower priority. For RTSs having the same priority level, RTS generator 140 can generate those RTSs in a round robin manner.

In addition, embodiments of the present invention support a service referred to herein as unspecific bit rate plus (UBR+). This service type defines a minimum bit rate (MBR) service that is maintained for a traffic flow between a particular source line card (coupled to iFGs 100, but not shown) and a particular destination line card (coupled to eFGs 300, but not shown). The bit rate (or bandwidth) between a source line card and a destination line card can exceed the guaranteed minimum when no contention for access to the destination line card exists. (Contention for a particular destination line card exists when the total bandwidth destined for that destination line card, summed over all source line cards, is greater than the bandwidth of its connection to the switch fabric.)

As packets are sent to an iFG 100, each packet has a destination line card address (i.e., a destination address corresponding to eFG 300 that also corresponds to a destination line card) and has a priority value. The UBR+ service relates to the packets having the lowest priority value (e.g., an initial priority value P3). The data portion of a given packet received at an iFG 100 is stored in a virtual output queue (within VOQ manager 120) that corresponds to the destination address and priority value of the packet. VOQ manager 120, for example, can have a virtual output queue for each priority value (e.g., 4 priority values) for each destination line card (e.g., 256 destination line cards at 4 priority values for a total of 1024 virtual output queues). The updated length of the virtual output queue (to which the data portion is stored) is sent to flow control 130.

If the priority value of the incoming cell does not correspond to the UBR+ service (e.g., an initial priority value of 3), then flow control 130 sends a "new cell" indication at the incoming priority value to the RTS generator 140. RTS generator 140 then increments a per-VOQ counter that keeps track of how many cells are eligible for a RTS to be sent to a GS 200. RTS generator 140 decrements the per-VOQ counter after it generates an RTS.

If, however, the priority value of the incoming cell corresponds to the UBR+ service (e.g., an initial priority value of 3, referred to herein as "P3"), then flow control 130 sends a "new cell" indication of the same priority value (e.g., priority value of 3) or at a reduced (or downgraded) priority value (e.g., priority value of 4, referred to herein as "P4") based on the difference between the current virtual output queue length and the software-configured threshold. When a cell is stored in a virtual output queue associated with the UBR+ service (at VOQ manager 120), the appropriate per-VOQ counter in the RTS generator 140 is incremented. Two different per-VOQ counters can be associated with a given virtual output queue: a per-VOQ counter associated with P3, and a per-VOQ counter associated with P4. When the number of cells buffered in the virtual output queue does not exceed the software-configured threshold, the per-VOQ counter associated with P4 is incremented. When the length of RTSs buffered in the virtual output queue exceeds the software-configured threshold, the per-VOQ counter associated with P3 is incremented.

Said another way, when the queue length is small, an incoming cell having a P3 priority is downgraded to P4; when the queue length is large, the incoming cell retains is P3 priority. Thus, when a GS 200 subsequently performs arbitration for the same destination, the RTS having a lower-numbered priority (i.e., a higher priority) can be given strict priority preference. In other words, P3 RTSs win over P4 RTSs when they contend for the same destination during arbitration.

In addition, when the length of a virtual output queue exceeds the software-configured threshold, a packet scheduler (located on the source line card, and not shown) sends packets destined for that destination line card at a rate not to exceed the software-configured MBR. To accomplish this, a flow-control signal at P4 priority for the appropriate destination is sent from the flow control 130 to the packet scheduler. Thus, the rate at which P3 RTSs are generated will be less than or equal to the configured MBR.

By ensuring that the total guaranteed bandwidth allocated to a particular destination line card does not exceeds the line card rate (i.e., not oversubscribed), the GSs 200 can issue a CTS for every P3 RTSs generated. This ensures that the length of a P3 virtual output queue will stabilize after it exceeds the software-configured threshold. Provided that enough buffering is allocated for a queue between the software-configured threshold and the queue length associated with the MBR, the queue length should not exceed that associated with the MBR. Thus, a given iFG 100 should not have to limit an associated packet scheduler to sending cells at a rate less than the configured MBR, thereby guaranteeing the MBR for the switch fabric.

The RTSs generated by RTS generator 140 are provided to RTS randomizer 150, which randomizes the order in which RTSs are assigned to time slots. More specifically, RTS randomizer 150 randomizes a link and time slot initially associated with a given RTS. Randomizing the link and time slot initially associated with a given RTS corresponds to sending that RTS to a random GS 200.

Figure 7:
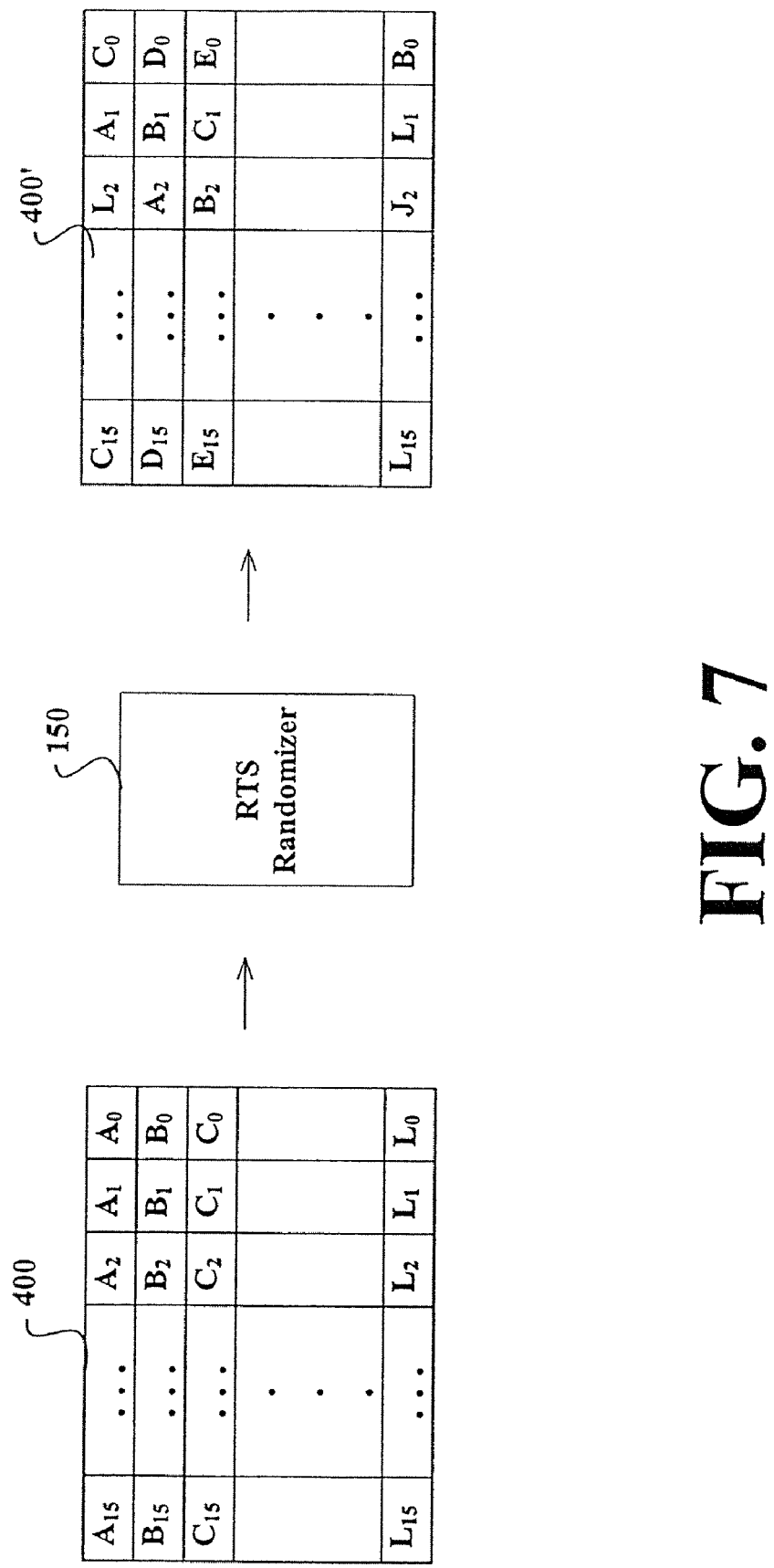
FIG. 7 illustrates a diagram of slot-based randomization of cells (and their associated request-to-sends (RTSs)) by a RTS randomizer, according to an embodiment of the present invention.

The FIG. 7 illustrates a diagram of slot-based randomization of time slots (and their associated RTSs) by a RTS randomizer, according to an embodiment of the present invention. As FIG. 7 illustrates, the RTSs can be provided in a frame-like structure, for example, having twelve rows and sixteen columns, where the letter and numerical index indicate generic frame cell within the frame. Each frame cell can have at least one associated RTS (for example, 1, 2, 3 or 4 RTSs per frame cell).

Under a slot-based randomization method, RTSs are randomized within a frame by performing randomization in the column, and then repeating the randomization process for each subsequent column. The randomization process within a column is performed by selecting randomly a row and translating the RTSs in that column so that the randomly selected row corresponds to the first row for that column and the remaining RTSs within that column maintain their order within that column.

In the specific example of FIG. 7, the RTSs of frame 400 undergo slot-based randomization by RTS randomizer 150 to produce frame 400'. For example, the third row is randomly selected for the first column; thus, the RTSs in the third row (i.e., $C_0$) in frame 400 is moved to the first row of the first column in frame 400', the RTSs in the fourth row (i.e., $D_0$) of frame 400 is moved to the second row of the first column of frame 400', etc. Following the example of FIG. 7, the first row is randomly selected for the second column of frame 400: the RTSs in the first row (i.e., $A_2$) of frame 400 is located in the first row of frame 400', the RTSs in the second row (i.e., $B_2$) of frame 400 is located in second row of frame 400', etc. This process is repeated for each column sequentially until the last slot (i.e., column) in the frame is randomized.

One of the benefits of slot-based randomization is that only a single-cell latency is introduced by RTS randomizer 150. More specifically, because each column of the frame is sequentially randomized, the delay for each column is no greater than that required to perform slot-based randomization for that column. Thus, the RTSs can be randomized as received within a frame column and a delay of no more than one frame cell slot time is incurred.

Figure 8:
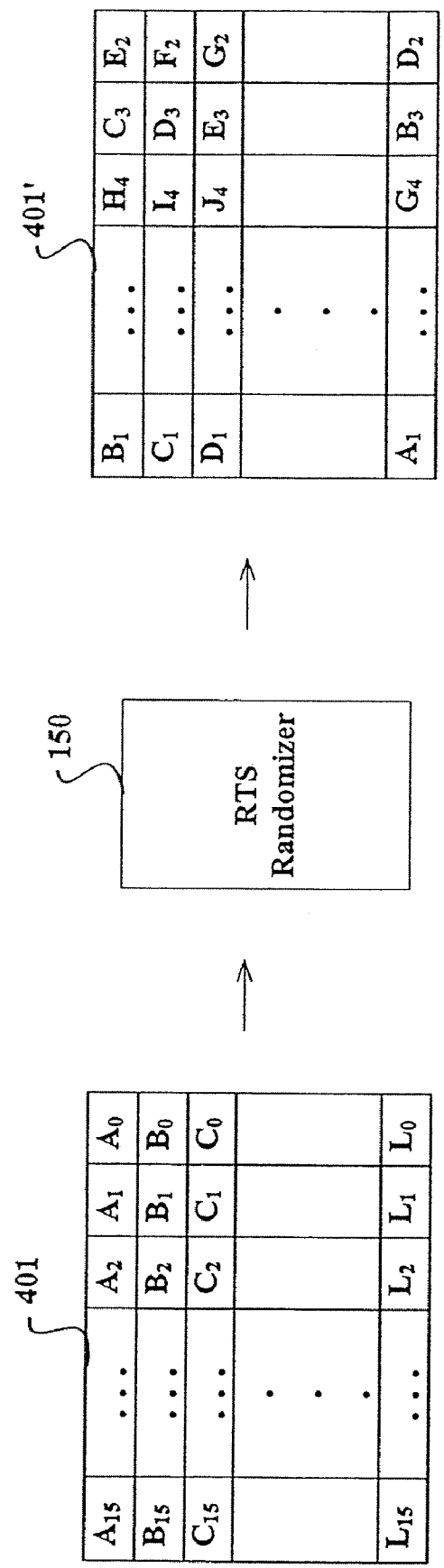
FIG. 8 illustrates a diagram of frame-based randomization of cells (and their RTSs) by a RTS randomizer, according to another embodiment of the present invention.

FIG. 8 illustrates a diagram of frame-based randomization of RTSs by a RTS randomizer, according to another embodiment of the present invention. Again, FIG. 8 illustrates the RTSs provided in a frame-like structure, for example, having twelve rows and sixteen columns, where the letter and numerical index indicate generic RTSs. Frame-based randomization randomizes the RTSs within a frame by selecting randomly a particular column within the frame from which to start the randomization process and with which to begin the randomized frame. Then, randomization is performed within that column, and then repeated for each subsequent column. From this point, similar to slot-based randomization, the frame-based randomization process within a column is performed by selecting randomly a row in that column and translating the RTSs in that column so that the randomly selected row corresponds to the first row for that column and the remaining RTSs within that column maintain their order within that column.

In the specific example of FIG. 8, the RTSs of frame 401 undergo frame-based randomization by RTS randomizer 150 to produce frame 401'. For example, the third column of frame 401 is randomly selected and is transposed to the first column of frame 401'. The RTSs within that column are now randomized; for example, the fifth row of this column (i.e., $E_2$) is randomly selected and is moved to the first row, the sixth row is moved to the second row (i.e., $F_2$), etc. Following the example of FIG. 8, the fourth column of frame 401 is moved to the second column of frame 401', and randomization within this column is performed so that the third row (i.e., $C_3$) is randomly selected and is moved to the first row, the fourth row (i.e., $D_3$) is moved to the second row, etc. This process is repeated for each column sequentially for the remaining columns within frame 401 until frame 401' is fully populated.

Although frame-based randomization introduces one frame of latency, the RTSs within a given frame are randomized to a greater extent than is the case for the slot-based randomization. This improved randomization results in frame-based randomization potentially providing a higher level of performance than the slot-based randomization. The worst case latency of one entire frame (i.e., sixteen cell time slots) can be introduced when the final column of the frame is selected at the initiation of the frame-based randomization process.

One of the underlying benefits to both slot-based randomization and frame-based randomization is that the randomization can be more easily implemented in hardware (and software) than a randomization scheme where the location of each RTSs is randomized individually. Such a scheme would require that previously randomized RTSs within a frame are tracked to determine available slots into which the newly randomized RTSs can be located within a frame. The slot-based randomization and the frame-based randomization described herein, however, advantageously do not require such tracking of previously randomized RTSs within a frame.

Returning to FIG. 2, the randomized RTSs are provided to the cell assembler 170 from the RTS randomizer 150 and payload data for cells are provided to the cell assembly 170 from VOQ manager 120. The cell assembler 170 assembles cells into the randomized RTS frame structure based on the VOQ link list maintained in VOQ manager 120. In other words, the RTSs received from the RTS randomizer 150 are combined with the data payloads for which CTS have been received (based on their corresponding RTSs that were previously sent and subsequently granted). These assembled cells are provided to the time slot buffer 180 which feeds them to the appropriate cell framer 190. Cell framers 190 buffer the assembled cells and sends them to the GSs 200.

As FIG. 4 illustrates, a GS 200 receives the assembled cells at the cell framer inputs 210, which forward the assembled cells to the deskew FIFO 220. The deskew FIFO 220 realigns in time the received cells. More specifically, the cells can be received at a given GS 200 from the various connected iFGs 100 at different times because the length of the connections between the iFGs 100 and a given GS 200 will likely differ. Consequently, even in a hypothetical case where the cells are sent from multiple iFGs 100 at the same time, the cells would arrive at a given GS 200 at different times. In addition, because the individual clock speeds for each iFG 100 will likely also differ, cells will arrive at a GS 200 from different iFGs 100 at different rates. The synchronization to compensate for these different clock speeds will be discussed below.

Figure 9:
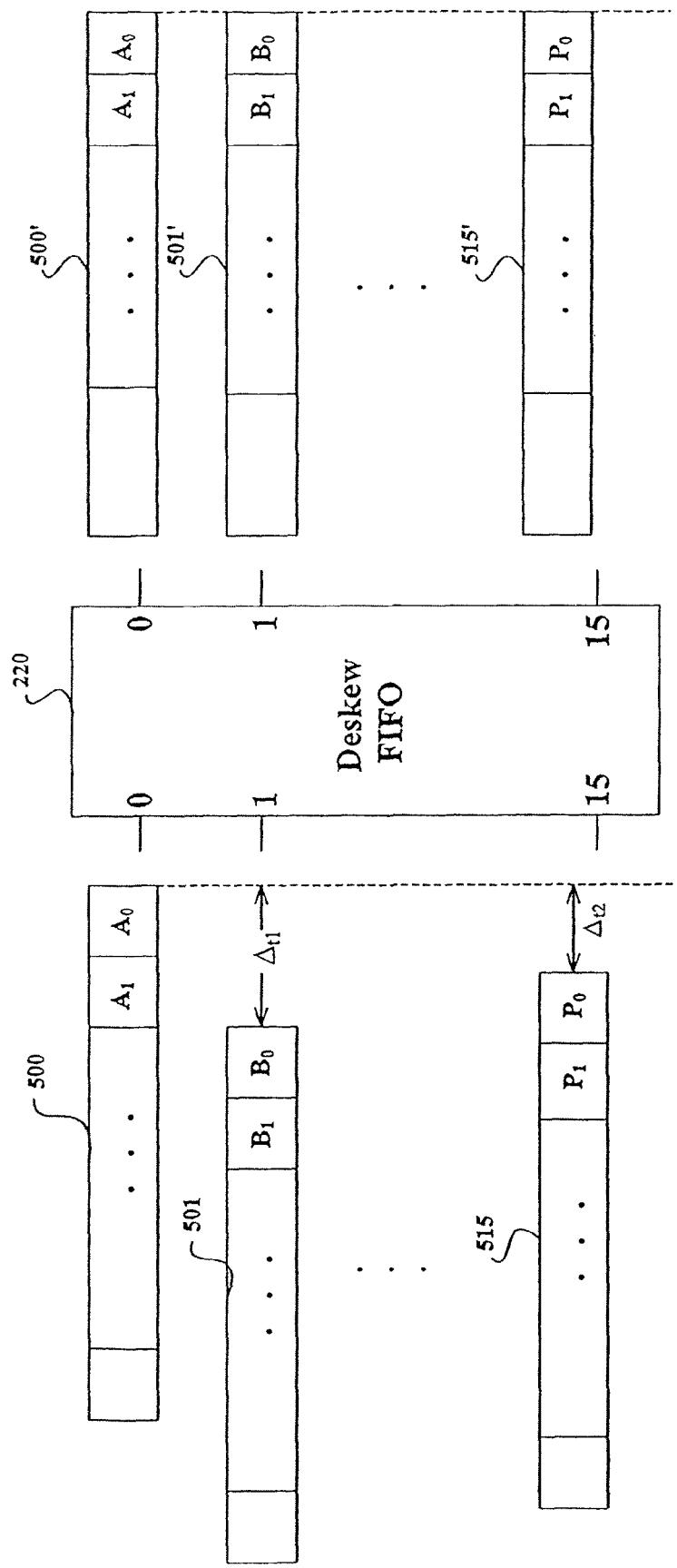
FIG. 9 illustrates a diagram of cells being realigned in time by a deskew FIFO (first in, first out), according to an embodiment of the present invention.

FIG. 9 illustrates a diagram of cells being realigned in time by a deskew FIFO, according to an embodiment of the present invention. As shown in FIG. 9, multiple cells can be received at the deskew FIFO 220 from a given a respective cell framer 210. For example, the cells 500 are received from cell framer inputs 210, the cells 501 are received from cell framer input$_1$ 210, and through to the cells 515 that are received from cell framer input$_{15}$ 210. In this example, cells 500 are offset from cells 501 by $\Delta t_1$ and cells 500 are offset from cells 515 by $\Delta t_2$. Deskew FIFO 220 realigns in time these cells to produce cells 500', 501' through to 515'; in other words, the first cell from cells 500', 501' through 515' are substantially aligned in time with respect to each other.

The deskew FIFO 220 aligns cells by buffering cells until a cell from each of the various cell framer inputs 210 is received. Once all cells for a column within a given frame are received by the deskew FIFO 220, those cells can be forwarded to the cell parser 240 (or, while in the MD configuration, to the MD cell slot translator 250 as described below) in time alignment.

In addition to alignment, the deskew FIFO 220 can keep track of a time-out period to ensure that all of the links between the GS 200 and its connected components (e.g., iFGs 100) are operational. In the case where a connection between a GS 200 and a connected components (e.g., an iFG 100) is not operational (e.g., severed), the deskew FIFO 220 determines that a time-out period has expired and that the connection is not operational. The deskew 220 then aligns in time the remaining cells, inserts an idle cell for the non-operational link and forwards the aligned cells. As described below in more detail, upon determining that a connection has failed, the GS 200 will stop any further CTSs from being sent to the iFG 100 associated with that failed connection. In addition, the corresponding iFG 100 also determines that a RTS time-out period has elapsed and, consequently, regenerates an RTS which is randomly sent out on a connection. In an alternative embodiment, an RTS can be regenerated and randomly sent out on a connection excluding the failed connection.

Figure 10:
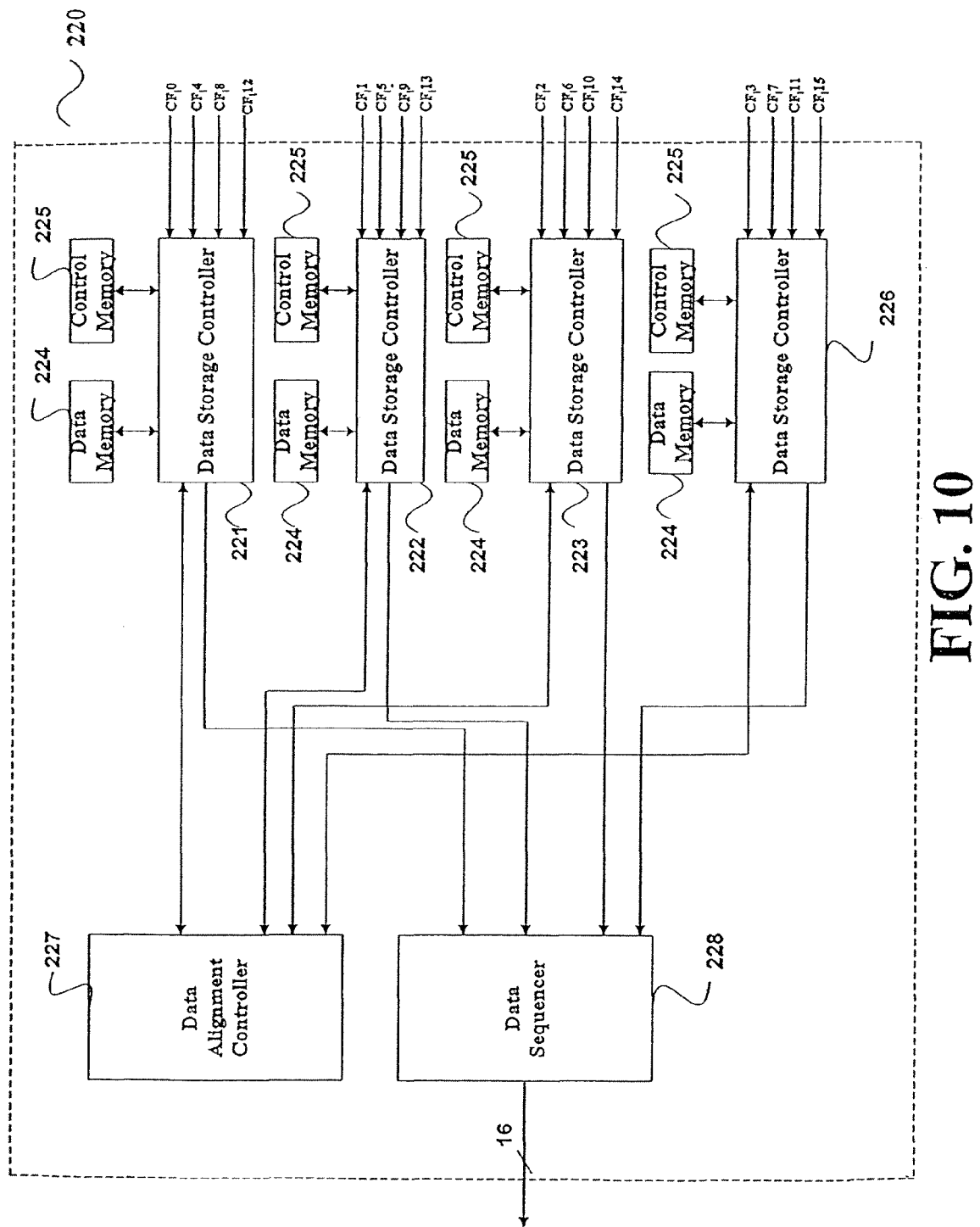
FIG. 10 illustrates a system block diagram of a deskew FIFO module, according to an embodiment of the present invention.

FIG. 10 illustrates a system block diagram of a deskew FIFO module, according to an embodiment of the present invention. Deskew FIFO 220 includes data storage controllers 221, 222, 223 and 226, each of which are coupled to their own respective data memory 224 and controller memory 225. Data storage controllers 221, 222, 223 and 226 are all connected to data alignment controller 227 and data sequencer 228. Data sequence 228 also provides an output from deskew FIFO 220.

Signals from cell framer inputs 210 are received at data storage controllers 221, 222, 223 and 226. More specifically, data storage controller 221 can receive signals from cell framer inputs 0, 4, 8 and 12. Data storage controller 222 can receive inputs from cell framers 1, 5, 9 and 11. Data storage controller 223 can receive inputs from cell framer inputs 2, 6, 10 and 14. Data storage controller 226 can receive inputs from cell framer inputs 3, 7, 11 and 15.

As cells are received at a data storage controller 221, 222, 223 and/or 226, the data associated with the cells are stored in the respective data memories 224. The received cells also have an associated status marker that indicates, for example, the state of the link between the GS 200 and associated iFG 100. For example, the status marker indicates if the link state is unknown, if the link is dead, if the link is experiencing good framing or if the link is experiencing bad framing. This status marker associated with a received cell can be stored in the respective control memory 225. As discussed above in reference to FIG. 10, cells are buffered in data memory 224 as they are received until a cell for a given time slot is received for all of the respective cell framer inputs 210. Once all of the cells have been received for a given time slot, as determined by data alignment controller 226, data alignment controller 226 can send a forwarding instruction to data storage controllers 221, 222, 223 and 226. This forwarding instruction thereby causes the data associated with the cells for that particular time slot to be forwarded to data sequencer 227. Data sequencer 227 converts the data received from data storage controllers 221, 222, 223 and 226 into a cell format and then forwards those cells to cell parser 240 (shown in FIG. 4).

Note that FIG. 10 has been described in reference to deskew FIFO 220 from a GS 200. A similar deskew FIFO module is also present in each eFG 300 as well as each iMD 600 and eMD 700 described below in further detail. In sum, each component within each physical stage of the switching fabric, in addition to the destination FGs (eFGs 300) will have a deskew FIFO module. More specifically, for the switching fabric having one physical switch stage, for example as illustrated in FIG. 1, the GSs 200 of the single physical stage in addition to the eFGs 300 will each have a deskew FIFO module. For other embodiments of the switch fabric having three physical switch stages as described above for example in reference to FIG. 5, each component of the three physical stages (i.e., the stages of iMDs 600, GSs 200 and eMDs 700), in addition to the eFGs 300, includes a deskew FIFO module similar to that described in reference to FIGS. 9 and 10.

Similar to the four data storage memories 221, 222, 223 and 226 (each having four inputs) that correspond to the associated 16 cell framer inputs 210 of a GS 200 (shown in FIG. 10), the deskew FIFO for each iMD 600 and eMD 700 can also include four data storage memories that correspond to the associated 16 cell framer inputs 210. The eFGs 300, however, each can have three data storage controllers (each having four inputs) corresponding to the associated 12 cell framer inputs 310.

Note also that the cells received at a given component (e.g., a GS 200) are received offset in time and at different rates from each other because the clocks associated with the components sending the cells (e.g., a set of connected iFGs 100) can be independent from each other. In other words, a set of components at a given stage can have asynchronous clocks with separate clock speeds. Consequently, a given stage of components (e.g., iFGs 100) can send cells at times and at rates different from that of other components within that same stage. Thus, as FIG. 9 shows, a connected component (e.g., a GS 200) of the next stage of components can receive cells from the components of the prior stage at a different time and at a different rate. This can occur for each stage of components: for example, for cells sent from the GSs 200 to the eFGs 300 for the embodiment shown in FIG. 1.

The clock speed differences of the various components within the switch fabric results in at least two potential problems for buffering cells awaiting transmission (e.g., at a GS 200). First, the differences in the clock speeds of the components (e.g., iFGs 100) that forward cells to a later-stage component (e.g., a GS 200) cause cells received from a component operating at a higher clock speed to be buffered to a greater extent than cells received from a component operating at a lower clock speed. In other words, cells from a component (e.g., an iFG 100) having a higher clock speed will have to be buffered (e.g., at a GS 200) while waiting for cells for the same time slot from a component (e.g., another iFG 100) having a lower clock speed.

Second, because the clock speed of a component (e.g., a GS 200) receiving cells can be less than the clock speeds of the various connected components (e.g., iFGs 100) sending cells to that component, cells awaiting transmission will have to be buffered. In other words, cells being sent to a component (e.g., a GS 200) faster than that component can send those cells will be buffered until those cells can be sent.

Taken these two potential problems to logical extremes, the buffering requirements for such a component (e.g., a GS 200) could increase with no end over time. To avoid this problem, the forwarding of cells can be suspended for an amount of time periodically. This is accomplished, for example, by sending periodically a synchronization signal to the iFGs 100. The iFGs 100 can then process and forward, for example, a predetermined amount of cells and then suspend forwarding of any more cells until the next synchronization signal is received at the iFGs 100. In such a manner, the iFGs 100 can control the rate at which cells are sent through and processed within the switch fabric.

The number of frames (each frame having a certain number of cells) that are processed and forwarded between synchronization signals is referred to herein for convenience as a "superframe." For example, a superframe can be defined as 1000 frames. In such a case, the number of cells that are processed and forwarded between two consecutive synch signals equals the number cells within 1000 frames. For example, the various iFGs 100 can send cells to the connected GSs 200 at their own individual clock speeds. Once a given iFG 100 has sent cells for a number of frames corresponding to a superframe (e.g., 1000 frames), that iFG 100 will suspend sending any further cells until it receives an indication that a new superframe is starting. Through the proper selection of the time period between synchronization signals, such an indication will only be received after every iFG 100 has completed sending cells for the superframe (e.g., 1000 frames).

The start of the next superframe can be indicated by a synchronization signal that originates from the GSs 200. A synchronization generator (not shown) external from the GSs 200 can determine the appropriate rate and time for a synchronization signal based on the difference between the fastest link in the system and the slowest link in the system and the time it takes to transmit a superframe. The amount of time between synchronization signals should be at least enough time for the slowest component (e.g., an iFG 100) to process and forward the cells within a superframe. More specifically, based on the manufacturer specification of the clock speeds for the various components within the switch fabric, the lowest and highest possible clock speeds are predetermined. The synchronization generator has its own clock and can then determine the appropriate number cycles (at its own clock speed) needed to ensure that the slowest possible clock within the switch fabric has a sufficient time between synchronization signals complete processing and forwarding of cells for that component (e.g., 16,000 cells within a superframe).

The synchronization generator can periodically send a synchronization signal to the GSs 200 to indicate the start of a superframe. The synchronization signal can be, for example, two one-byte characters followed by a link identifier. Upon receiving such a synchronization signal, each GS 200 can then include a start-of-superframe indicator in the first cell transmitted. For example, upon receiving a synchronization signal, the GSs 200 can each associate two one-byte characters (indicating the start of a superframe) into the stream of bytes transmitted from the GSs 200 on their respective links. These synchronization characters can then be used by the different stages of the switch fabric to define the start of the superframe structure/sequence. In other words, as the components in the next stage receive those cells from the GSs 200 (e.g., the eFGs 600 for the configuration shown in FIG. 1; the eMDs 700 for the configuration shown in FIG. 5), those next-stage components will recognize the start of the superframe based on the start-of-superframe indicator. Consequently, those components can process and forward the cells appropriately and if another physical switching stage exists (e.g., the eFGs 300 for the configuration shown in FIG. 5), then those components will recognize the start of the superframe.

Note that as an egress component (e.g., eFGs 300 or eMDs 700) receives cells indicating the start of a superframe, that egress component provides a synchronization signal to the associated (or possibly co-located) ingress component (e.g., iFGs 100 or iMDs 600). Thus, the start of a superframe can be indicated starting from the GSs 200 to the next connected physical switching stages. Once the iFGs 100 have received an indication that the next superframe can be started, the iFGs 100 can reinitiate sending cells for the next superframe.

Returning to FIG. 4, cell parser 240 receives the aligned cells from deskew FIFO 220. Cell parser 240 parses each cell into RTS, grant, flow control and data payload portions. The grant and data payload portions for that cell are sent to and stored in data RAM 270, the flow control portion for that cell is sent to the cell assembler 280, and the RTS portion (e.g., having four RTSs) for that cell is sent to cell scheduler 260.

Cell scheduler 260 performs a number of functions related to received RTSs including RTS grouping, RTS arbitration and RTS time out. In general, cell scheduler 260 resolves potential congestion by examining the RTSs from the connected iFGs 100 and determining which iFG 100 will be allowed to send data to each eFG 300 for a given cell time slot. In cases where multiple iFGs 100 request to send data to the same eFG 300, the GSs 200 determines which iFG 100 will have its request granted. After a GS 200 has arbitrated among the RTSs destined for a particular eFG 300, any potential congestion will have been resolved because the GS 200 will have allowed no more that one data transfer to any given link of an eFG 300 for a given cell time slot. Said another way, no more than one CTS (and thereby no more than one data cell) will be granted for a given link of an eFG 300 within a given cell time slot.

RTSs received at a GS 200 are grouped together before being arbitrated. Grouping the RTSs allows a greater number of RTSs to be considered during arbitration and thereby make it more likely that more of the available cell time slots will be filled with a grant (i.e., a CTS). Consequently, the more RTSs that are grouped together, the higher the throughput (i.e., the fewer cell time slots that remain empty). Grouping RTSs, however, can cause RTSs to be buffered for a longer time than would otherwise be the case thereby introducing some added latency for recovering lost RTSs. The grouping RTSs is described in connection with FIG. 11.

Figure 11:
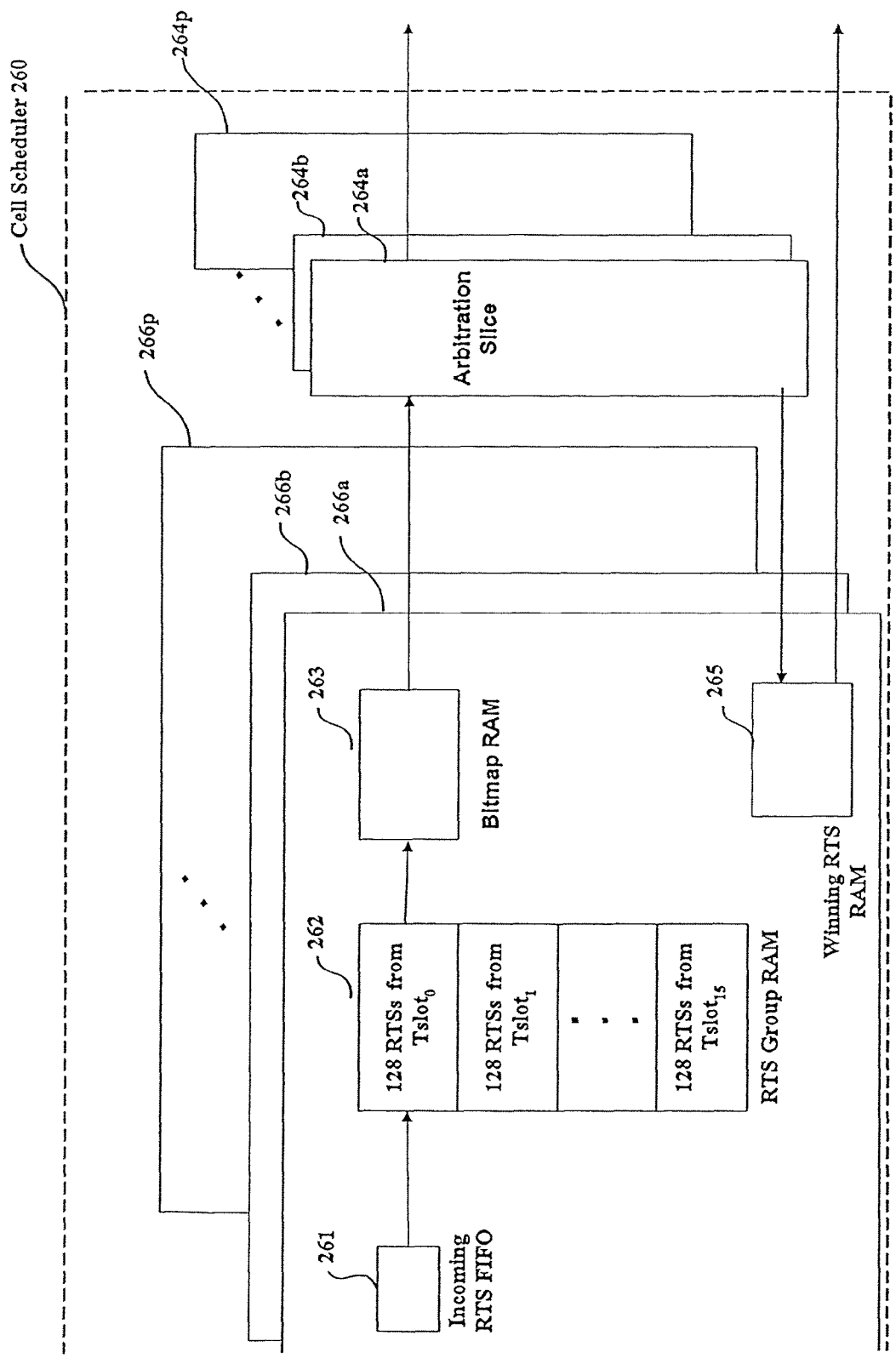
FIG. 11 illustrates a system block diagram of the memory structure for the cell scheduler, according to an embodiment of the present invention.

FIG. 11 illustrates a system block diagram of the memory structure for the cell scheduler, according to an embodiment of the present invention. As shown in FIG. 11, cell scheduler 260 includes a set of RTS slices 266a through 266p and a set of arbitration slices 264a through 264p. Each RTS slice 266 (e.g., RTS slice 266a) includes incoming RTS FIFO 261, RTS group RAMs 262, bitmap RAM 263, which are connected in series, and winner RTS RAM 265. A given RTS slice 266 is coupled to a respective arbitration slice 264 (e.g., RTS slice 266a is coupled to arbitration slice 264a) through the bitmap RAM 263 and winning RTS RAM 265. Arbitration slices 264a through 264p and winning RTS RAM 265 (for each RTS slice 266a through 266p) provide output from RTS analyzer 260 to time slot buffer 285.

For a given RTS slice 266 (e.g., RTS slice 266a), incoming RTS FIFO 261 acts as a staging FIFO so that as RTSs are received at the cell scheduler 260, the RTSs can be moved into the RTS group RAMs 262. The bitmap RAM 263 format the RTSs into a request vector that is provided to the arbitration slice 264. The respective arbitration slice 264 (e.g., arbitration slice 264a) performs arbitration of the RTSs and generates CTSs (via grants of the arbitration process). The winning RTS RAM 265 stores the resulting CTSs and forwards them to the cell assembler 280.

More specifically, RTSs associated with a given time slot are buffered within RTS group RAMs 262. The RTS group RAMs 262 acts as a queue where a given RTS remains within the queue for a certain number for frames (e.g., 32 frames) or is selected by arbitration, whichever occurs first. During each frame, at least one new RTS is received for each time slot and an old RTS (e.g., the 32nd prior frame) is dropped off the end of the RTS queue. Because multiple RTSs (e.g., up to 4 RTSs) can be sent by a given iFG 100 each frame, each RTS queue can hold, for example, 128 RTSs for an iFG 100.

Figure 12:
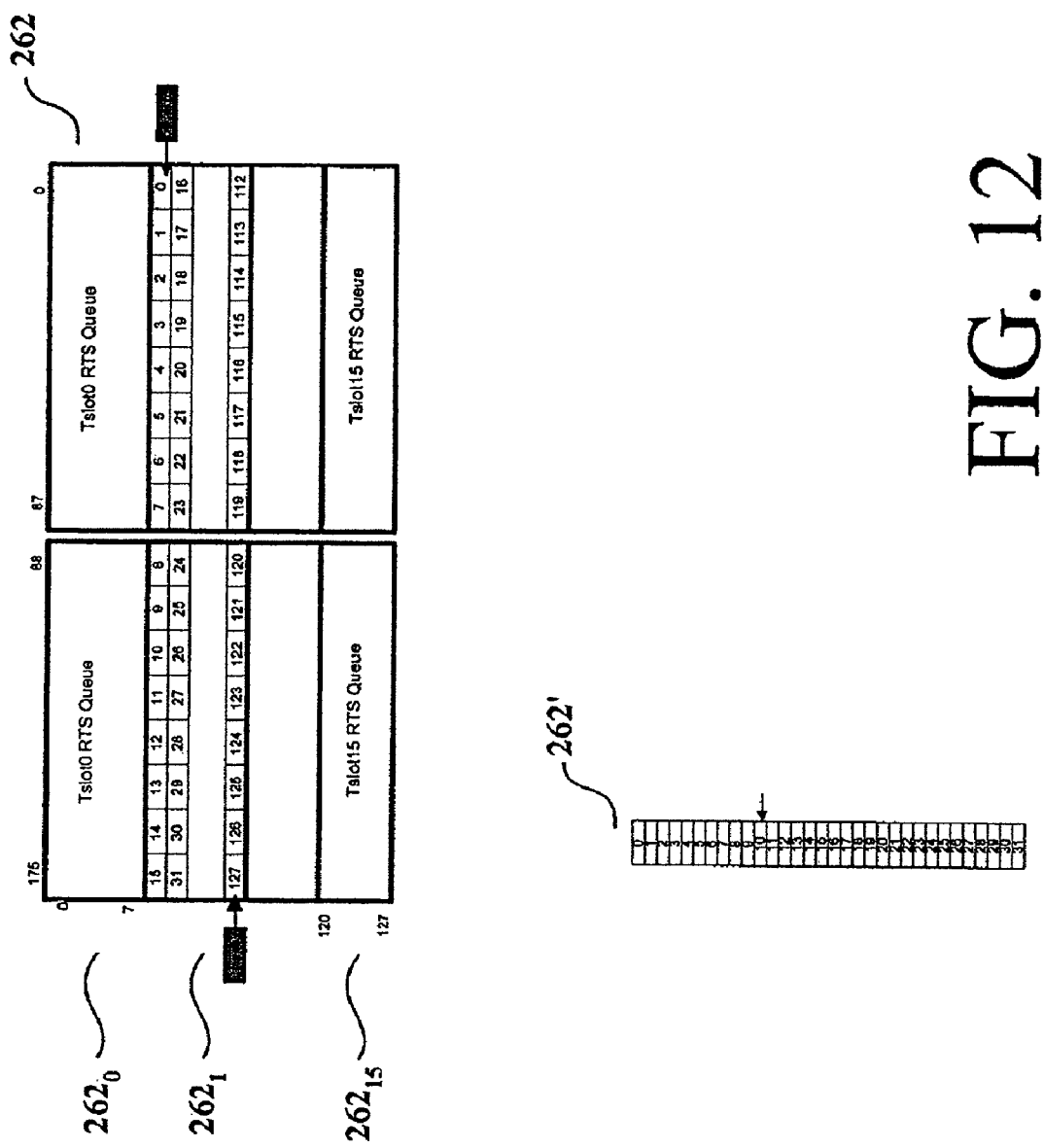
FIG. 12 shows an example of the structure of the RTS group RAMs, according to an embodiment of the present invention.

FIG. 12 shows an example of the structure of an RTS group RAMs, according to an embodiment of the present invention. As FIG. 12 shows, the RTS group RAMs 262 can be structured to store queues for multiple iFGs 100 (e.g., 16 iFGs 100). As shown in FIG. 12, RTS group RAMs 262 have RTS queues $262_0$ through $262_{15}$ each one of which is uniquely associated with its own iFG 100. In this embodiment, each row of the RTS group RAMs 262 can store sixteen 11-bit RTSs for a given iFG 100; each RTS queue $262_0$ through $262_{15}$ can be structured from 8 rows. Thus, 128 rows within the RTS group RAMs 262 can store RTS queues for 16 iFGs 100.

Head/tail pointer 262' tracts the arrival and dropping of RTSs. During each frame, new RTSs arrive (e.g., 4 RTSs) and old RTSs (e.g., 4 RTSs) are dropped for each iFG 100 associated with the RTS group RAMs 262. In other words, as RTSs arrive during each frame, the head/tail pointer 262' points to the location for each RTS queue $262_0$ through $262_{15}$ in which 4 previously stored RTSs are dropped and the 4 newly arrived RTSs are written. Consequently, each RTS queue $262_0$ through $262_{15}$ is fully stored with recently arrived RTSs, and drops and adds 4 RTSs per frame.

For example, FIG. 12 shows head/tail pointer 262' for the RTS group RAM 262. In this example, head/tail pointer 262' points to address 10. During this frame, the 4 RTSs stored at RTS locations 36-39 within RTS queues $262_0$ through $262_{15}$ (i.e., bits 44-87 of the third row for RTS queues) are dropped from their respective RTS queues and the 4 newly arrived RTSs for each RTS queue $262_0$ through $262_{15}$ are stored at RTS locations 36-39 within their respective RTS queues. Because every RTS slice 266a through 266p has its own RTS group RAMs 262, the RTSs for each iFG 100 are grouped together (for each iFG 100 out of all, for example, 256 iFGs 100) and, thus, considered collectively during arbitration as described below.

During arbitration, arbitration slices 264a through 264p consider the grouped RTSs for each iFG 100. Rather than perform multiple reads of the RTS group RAMs 262 for just a single iFG 100, bitmap RAM 263 stores a vector that summarizes the contents of the grouped RTSs for each iFG 100. In other words, bitmap RAM 263 maintains a running, updated mapping of iFG-to-eFG requests for that respective RTS slice 266.

Bitmap RAM 263 can include multiple RTS vectors, each of which is uniquely associated with a respective RTS group RAM $262_0$-$262_{15}$. For every iFG-to-eFG request, the request (e.g., a 3-bit request) is maintained within the appropriate RTS vector within bitmap RAM 263. For example, in an embodiment where the request is a 3-bit request, the 3 bits correspond to the highest priority RTS. Values 0 through 5 can represent valid requests, and value 7 can represent an invalid request (or the absence of a request for a particular iFG 100-eFG 300 combination). In the case where an iFG 100 has multiple RTSs requesting a particular eFG 300, that eFG's location within the bitmap RAM 263 would hold a 3-bit value corresponding to the priority for the highest priority RTS.

Figure 13:
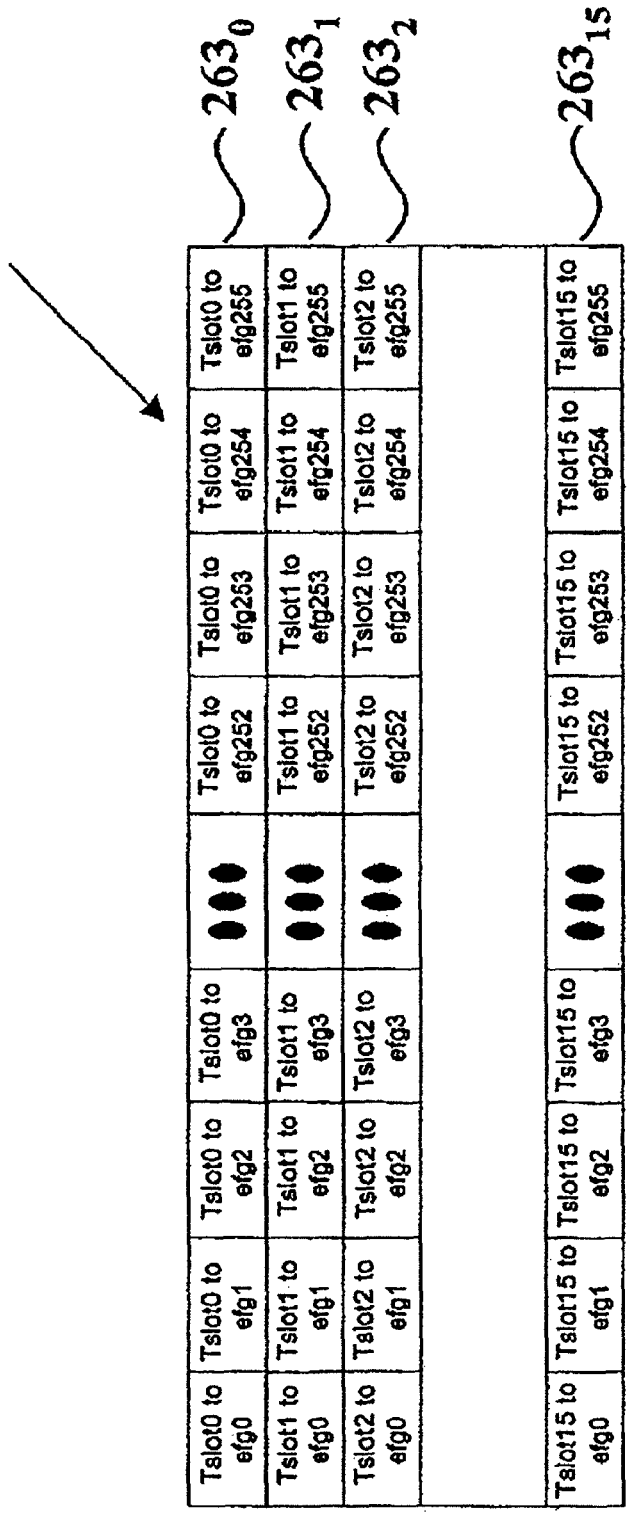
FIG. 13 shows an example of the structure of the bitmap RAM, according to an embodiment of the present invention.

FIG. 13 shows an example of the structure of the bitmap RAM, according to an embodiment of the present invention. As shown in FIG. 13, bitmap RAM 263 has 16 RTS vectors $263_0$ through $263_{15}$, each of which is uniquely associated with a RTS group RAM $262_0$ through $262_{15}$. For example, RTS vector $263_0$ can store 256 3-bit iFG-to-eFG requests for $eFG_0$ to $eFG_{255}$ (for the switch fabric embodiment having 256 iFGs 100 and 256 eFGs 300).

The bitmap RAM 263 allows the respective arbitration slice 264 (e.g., arbitration slice 264a for the bitmap RAM 263 of RTS slice 266a) to read one entire 256-wide RTS vector every clock cycle. With the pipelining in the respective arbitration slice 264, the resulting performance allows each iFG vector to partake in multiple separate arbitration iterations (e.g., 13 separate arbitration iterations).

As a consequence of the condensed format of the bitmap rows $263_0$-$263_{15}$ within bitmap RAM 263, winning RTSs selected by the respective arbitration slice 264 cannot be easily associated with their queue positions within RTS group RAMs 262 without the winning RTS RAM 265. The contents of the registers within winning RTS RAM 265 can be cleared at the beginning of each frame. Over the course of the arbitration process within, for example, a given frame (and, for example, over multiple iterations of the arbitration process), the registers within winning RTS RAM 265 can store the input-to-output mapping that result from the arbitration process. Once the arbitration process is complete for a given period (e.g., a given frame), the arbitration winners within winning RTS RAM 265 are used to form CTSs that are sent the respective iFGs 100 that are connected to a respective GS 200. A given CTS includes the queue position within the RTS group RAMs 262, which correspondingly indicates the frame number and RTS identifier associated with the associated winning RTS. Arbitration losers, however, are cleared from the winning RTS RAM 265 and are considered during the next round of arbitration (because the RTSs corresponding to the arbitration losers are not removed from the RTS group RAM 262 until they time out or eventually win during the arbitration process).

Figure 14:
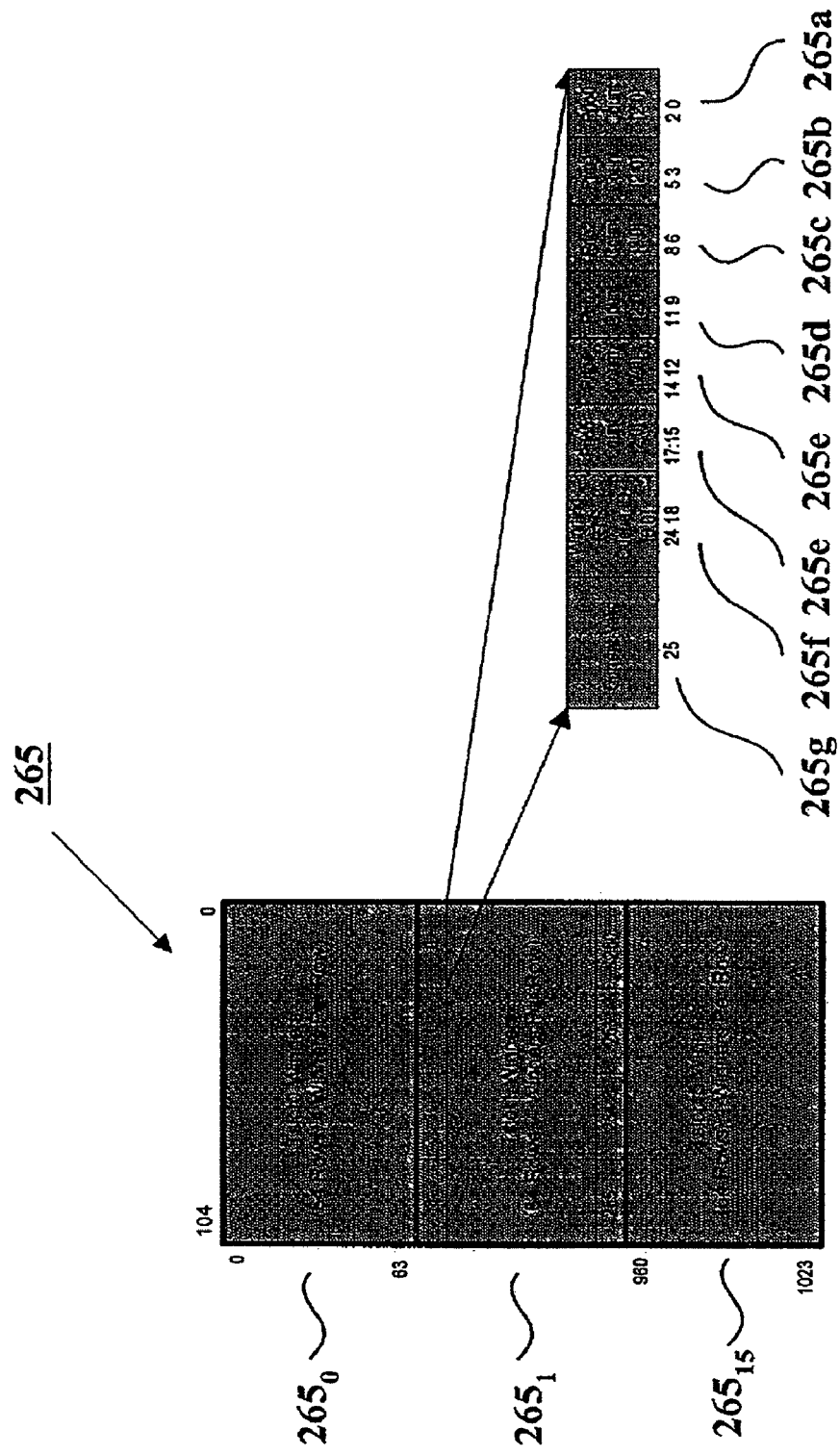
FIG. 14 shows an example of the structure of the winning RTS RAM, according to an embodiment of the present invention.

FIG. 14 shows an example of the structure of the winning RTS RAM, according to an embodiment of the present invention. Winning RTS RAM 265 maintains a FIFO identifier for every RTS in every row of the bitmap RAM 263. In the embodiment shown in FIG. 9D, the winning RTS RAM 265 stores 256 winner identifiers associated with each bitmap $263_0$-$263_{15}$. Each row within the winning RTS RAM 265 represents 4 26-bit winner identifiers. Thus, 64 such rows within winning RTS RAM 265 can represent the 256 eFGs 300 associated with a given iFG 100. The winning RTS RAM 265 can be organized as 1024 rows with 104 bits per row.

As shown in FIG. 14, each 26-bit winner identifier includes six 3-bit priority count fields 265a through 265f, a 7-bit winner RTS queue identifier field 265g and a one-bit current-valid field 265h. The six priority count fields 265a through 265f indicate the priority value to be placed in the related field within the bitmap RAM 263, as described below. The winner RTS queue identifier field 265g maintains the winner queue identifier for every RTS within the respective row of the bitmap RAM 263. The current-valid field 265h indicates whether the RTS is valid or invalid. An invalid RTS can indicate an invalid request or the absence of a request for a particular iFG-eFG combination.

In the case where an RTS drops off an RTS queue (within RTS group RAMs 262) or an RTS receives a grant via the arbitration process, the priority count fields 265a through 265f can indicate the new value to be used in the bitmap RAM 263. Rather than scanning the entire RTS queue (e.g., a queue having 128 RTSs) within the RTS group RAMs 262, the priority count fields can provide a quicker new value for the bitmap RAM 263.

Figure 15:
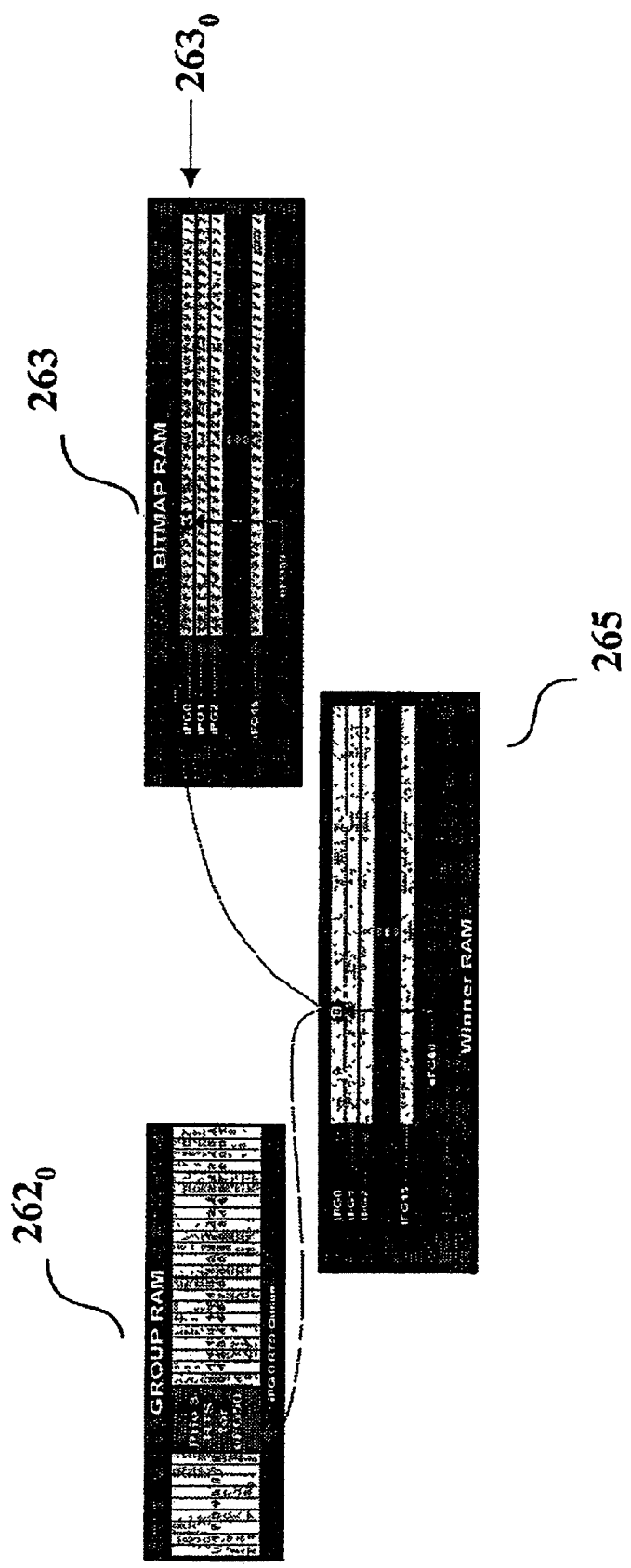
FIG. 15 shows an example of the interaction between RTS group RAMs, bitmap RAM and winning RTS RAM shown in FIGS. 11-14.

FIG. 15 shows an example of the interaction between RTS group RAMs, bitmap RAM and winning RTS RAM shown in FIGS. 11-14. In this example, an RTS associated with $iFG_0$ and $eFG_{50}$, and having a priority value of 3 is received at the cell scheduler 260. As shown in FIG. 9E, RTS queue $262_0$ from RTS group RAMs 262 (which is associated with $iFG_0$) holds the RTS for the $iFG_0$-$eFG_{50}$ combination with a priority value of 3. Correspondingly, the $50^{th}$ slot (i.e., the slot associated with $eFG_{50}$) of bitmap row $263_0$ (i.e., associated $iFG_0$) within the bitmap RAM 263 holds a value of 3, which corresponds to the priority value of the RTS held in the RTS queue $262_0$. To link the bitmap row $263_0$ of bitmap RAM 263 to the RTS group RAM 262, the winning RAM 265 stores a value of 9 in the winning RTS queue identifier field 265f for the location associated with the $iFG_0$-$eFG_{50}$ combination.

Cell assembler 280 reassembles cells from the data portions stored in data RAM 270 based on the control information provided by cells parser 240 and cell scheduler 260. The assembled cells are provided to time slot engine 285 where the cells are forwarded to the cell framer outputs 290 for output from the GS 200. Time slot engine 285 can buffer received cells until a cell for every cell framer output 290 is received, at which point the cells for that time slot can be forwarded. The time slot engine 285 can a feature that allows it to select appropriately for ingress MD signals and egress MD signals corresponding to whether the MD in configured as an iMD 600 or an eMD 700. The time slot engine 285 includes a backpressure mechanism that can suspend the forwarding of cells to the cell framer outputs 290 when their individual buffers (e.g., first in, first out buffers) start to reach a near overflow status.

The arbitration process is performed by the arbitration slices 264a through 264p. Arbitration is performed for all received RTSs to create a mapping of which inputs will be routed to which outputs. The arbitration process (discussed below in reference to FIGS. 16 through 17) can be repeated for multiple iterations. A given arbitration slice 264 considers the all of the eFGs 300 (e.g., 256 eFGs 300) for the iFG within a given bitmap row $263_0$ through $263_{15}$. Thus, a given arbitration slice 264 performs arbitration simultaneously for its associated iFGs 100 (e.g., 16 iFGs 100). Thus, for a given GS 200, the multiple arbitration slices 264a through 264p can perform arbitration to define paths between all 256 iFGs to all 256 eFGs 300.

The arbitration process begins by performing eFG selection. An arbitration slice reads out one bitrow $263_0$ through $263_{15}$ at a time and performs arbitration over the RTSs associated with that bitrow (e.g., 256 RTSs within a bitmap row). The step of the arbitration process is described further in reference to FIG. 16.

Figure 16:
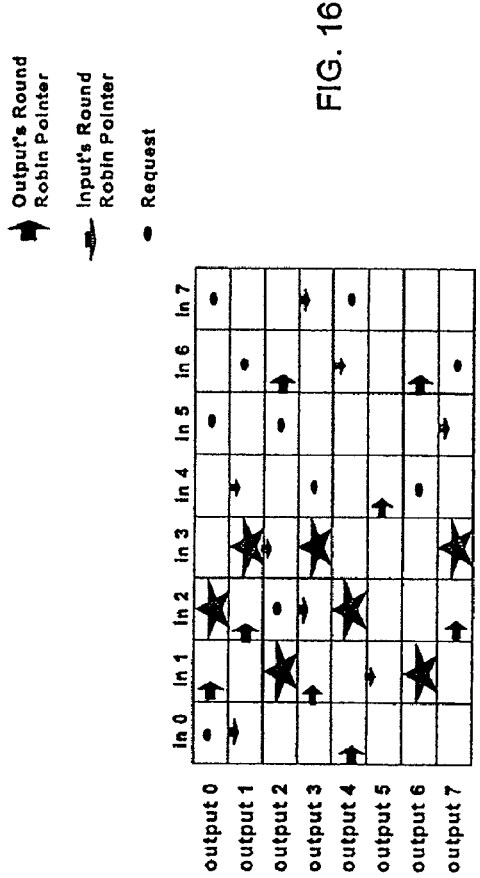
FIGS. 16 through 18 illustrate a graphic representation of a portion of the register arrays in an arbitration slice during the arbitration process, according to an embodiment of the present invention.

FIG. 16 shows a graphic representation of a portion of register arrays within an arbitration slice 264 during the arbitration process, according to an embodiment of the present invention. FIG. 16 shows a matrix representing the various input links and output links of a GS 200 at which RTSs have been received. An RTS is represented in the figure as a filled-in circle and labeled in the legend as a "request". For example, an RTS received on input link 1 and designating an output link 2 (i.e., specifying the eFG 300 that is associated with output link 2 of the GS 200) is represented in the corresponding cell of the matrix shown in FIG. 16. Each input link is represented as a column in FIG. 16 and has an associated pointer represented graphically as a downward arrow. Each output link is represented as a row in FIG. 16 and has an associated pointer represented graphically as a rightward arrow.

FIG. 16 also shows where an RTS for each output link has been selected as a "winning" output from the RTS(s) received at each given output link. In this example, the RTSs for a given output link are selected based on a round-robin methodology. In other embodiments, other selection methods are possible, such as for example, random. The RTSs selected for each output link are designated graphically in FIG. 16 with a star. For example, output link 1 has two associated RTSs: one having a designation for input link 3 and another having a designation for input link 6. Because the output-link pointer for output link 1 has a value pointing to input link 3, the next RTS associated with output link 1 and after input link 2 is the RTS at input link 3 and output link 1. Thus, this RTS is selected for this output link; represented graphically in the figure as a star. This process is repeated for the remaining output links. FIG. 16 shows examples of other selected RTSs, one for each output link shown.

Figure 17:
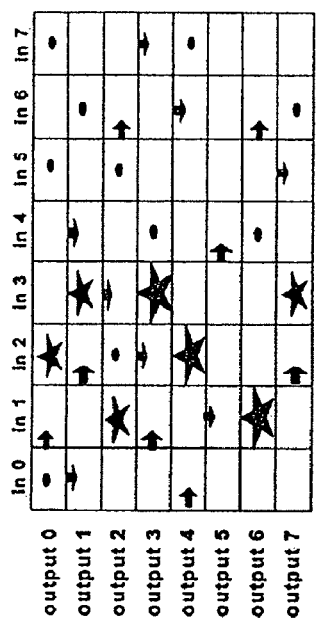

The arbitration winners for every iFG are temporarily stored in a staging RAM within the arbitration slice 264 (not shown in FIG. 11). During the next step in the arbitration process, FIG. 17 shows the matrix of FIG. 16 where an RTS for each input link has been selected as a "winning" input from the RTSs selected in the output-link-based selection. In this example, the RTSs for a given input link is selected based on, for example, a round-robin methodology from the selected RTSs (i.e., previously selected by the output-link-based selection). The RTSs selected for each input link are represented graphically in FIG. 17 with a star having an interior star. For example, input link 3 has three associated RTSs which were previously selected by the output-link-based selection: the RTS associated with input link 4, output link 1; the RTS associated with input link 3, output link 3; and the RTS associated with input link 3, output 7. Because the input-link pointer for input link 3 has a value pointing to output link 2, the next RTS associated with input link 3 (which has also been previously selected during the input-link-based selection) is the RTS associated with input link 3, output link 3. Thus, this RTS is selected as a winner for input link 3, output link 3 for this iteration of the arbitration process (and for which there can be several iterations within a given frame period).

Figure 18:
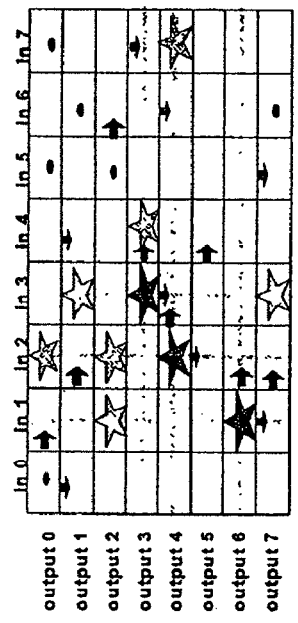

FIG. 18 shows an updated version of the matrix of FIG. 17 based on the prior arbitration results. In updating the matrix for another iteration of the arbitration process, the "losing" RTSs for this iteration are removed, and the input-link pointers and the output-link pointers are advanced. For example, because the RTS associated with input link 3, output link 3 was selected through the arbitration process, the remaining RTSs associated with input link 3 or output link 3 are removed. These removed RTSs are graphically indicated in FIG. 18 by a star without an interior star. In other words, the RTSs associated with input link 3 or output link 3 shown in FIG. 16 are removed and indicated as a star without an interior star in FIG. 18 (e.g., RTS at input link 3, output link 1).

As shown in FIG. 18, the input-link pointers and output-link pointers are advanced to the respective link beyond that corresponding to the selected RTS. For example, the RTS selected for output link 3 corresponds to input link 3; thus, the output link 3 is advanced from input link 1 to input link 4. Similarly, the RTS selected for input link 3 corresponds to output link 3; thus, the input-link pointer for input link 3 is advanced from output link 2 to output link 4. This process is also performed for the remaining RTS winners from the prior iteration.

The arbitration process can be repeated for additional iteration(s) using the values in the register arrays in the arbitration slice 264. If the arbitration process is to be iterated, the number of iterations can be, for example, 13. Once iterations of the arbitration process are completed, for example, within a particular frame time, new RTSs can be populated into the respective arbitration 264 from bitmap RAM 263 for new iteration(s) of the arbitration process. Note that the RTSs to be arbitrated in future rounds of arbitration have been grouped together via RTS group RAMs 262.

Returning to the operation of the iMDs 600, the cells received at an iMD 600 from connected iFGs 100 have their cell positions within a frame translated before being forwarded to connected GSs 200. As described in greater detail below, MD cell slot translator 250 receives the cells from deskew FIFO 220 and translates the cells position within their various slots.

Figure 19:
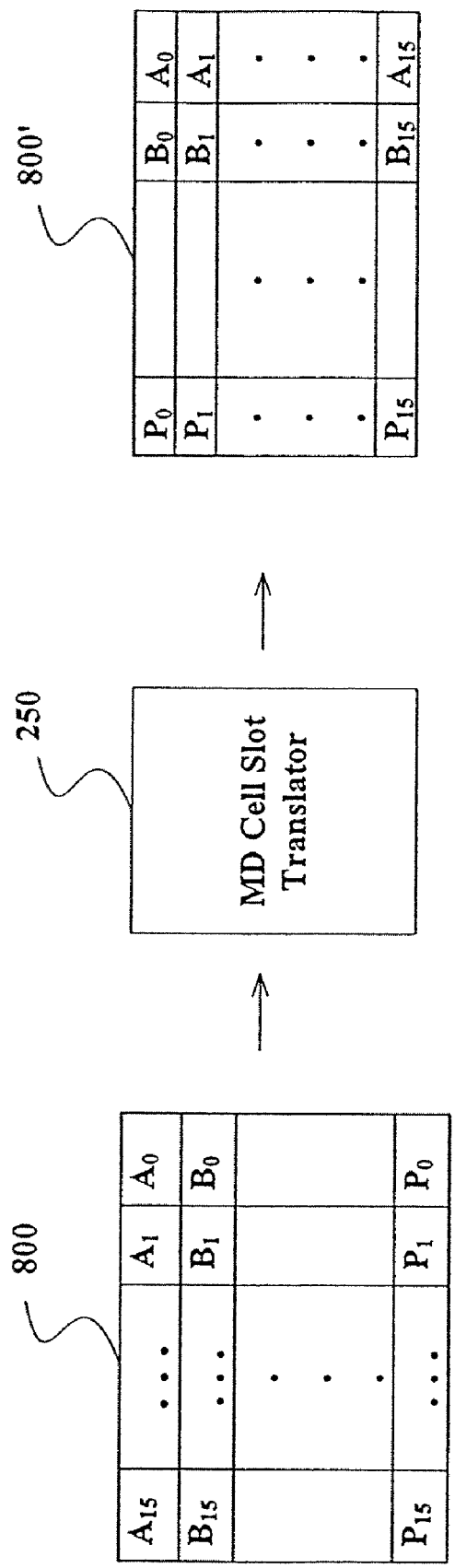
FIG. 19 illustrates a diagram of cell slot translation by a MD cell slot translator, according to an embodiment of the present invention.

FIG. 19 illustrates a diagram of cell slot translation by a MD cell slot translator, according to an embodiment of the present invention. As FIG. 19 illustrates, the cells can be provided in a frame-like structure having, for example, sixteen rows and sixteen columns, where the letter and numerical index indicate generic cells. In the embodiment illustrated by FIG. 19, MD cell slot translator 250 translates a row in the received frame 800 into a column in the translated frame 800'. More specifically, for example, the first row in frame 800 is translated into the first column of frame 800'. The second row of frame 800 is translated to the second column of frame 800'. T is process repeated for the remaining rows of the received frame 800 so that these remaining rows are translated into columns of translated frame 800'.

Note that this particular embodiment of a cell-translation process creates latency of about one frame due to the fact that the entire frame 800 must be received by MD cell slot translator 250 before the translated frame 800' can be produced. More specifically, in the example illustrated in FIG. 19, the first row of translated frame 800' cannot be produced until the final row of received frame 800 is received by MD cell slot translator 250. For example, cell $A_{15}$ of frame 800 must be received by MD cell slot translator 250 before the first column of frame 800', which includes cell $A_{15}$, is produced. Thus, when the associated cell payloads are subsequently assembled into a frame by cell assembler 170 and sent from the iFGs 100 through the GSs 200 to the eFGs 300, these cell payloads need to be reordered to reacquire their original order. This reordering can be performed at the eFGs 300.

Figure 20:
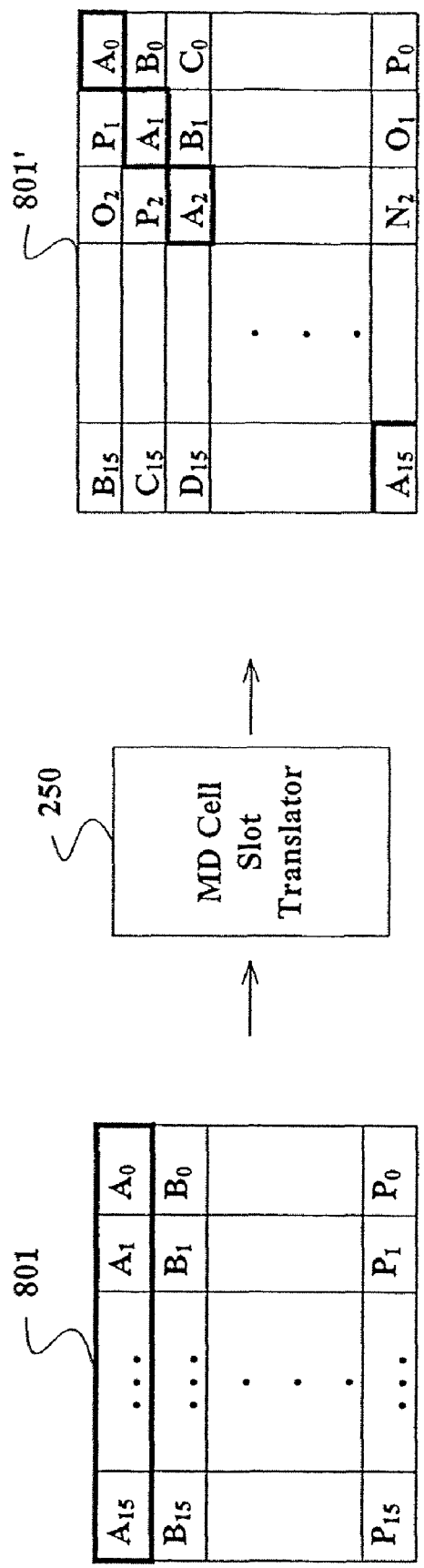
FIG. 20 illustrates a diagram of cell slot translation by a MD cell slot translator, according to another embodiment of the present invention.

FIG. 20 illustrates a diagram of cell slot translation by a MD cell slot translator, according to another embodiment of the present invention. As FIG. 20 illustrates, the cells can be provided in a frame-like structure having, for example, sixteen rows and sixteen columns, where the letter and numeric index indicates generic cells. In this embodiment illustrated by FIG. 20, MD cell slot translator 250 shifts the cells in each column one additional row from the shift in the prior column.

More specifically, in the specific example of FIG. 20, MD cell slot translator 250 translates received frame 801 to produce translated frame 801'. For illustration purposes, a specific row of received frame 801 is outlined in bold and those cells after being translated are outlined in bold in translated frame 801'. In this specific example, the first cell of the first row in frame 801, $A_0$, is also in the first cell and first row of translated frame 801'. Similarly, all of the remaining cells in the first column of received frame 801 are in the same position in the first column of translated frame 801'. The cells in the second column of frame 801, which includes for example cell $A_1$, are translated one row (i.e., shifted down one row) in the translated frame 801'. In this specific example, $A_1$ in the first row second column of the received frame 801 is translated into the second row second column of translated frame 801'. Similarly, the remaining cells in the second column of the received frame 801 are also translated to the next row in the second column of translated frame 801'. This process is repeated for the remaining cells in received frame 801, including the final column of frame 801 where, for example, the cell $A_{15}$ in the first row, sixteenth column is translated to the sixteenth row, sixteenth column of translated frame 801'.

While both the translation processes illustrated by FIG. 20 and FIG. 19 allow traffic to be spread over multiple GSs 200, the latency associated with each translation process differs. More specifically, the latency for the translation process illustrated by FIG. 20 is about one cell slot; in other words, each cell is delayed no more than one cell slot. The latency for the translation process illustrated by FIG. 19, however, is on the order of the time for one frame. In other words, because a cell in the first cell slot of a frame (e.g., $P_0$) can be delayed to the final cell slot of that frame, the overall latency of is about the time for one frame. In the example shown in FIG. 19, the frame has sixteen cell slots and the latency for the translation process is fifteen cell slots (i.e., the delay to translate $P_0$ from the first cell slot to the sixteenth cell slot).

FIGS. 19 and 20 have been discussed in reference to iMD 600. The similar, but opposite, process of untranslating the cell slot positions is also performed by eMD 700; essentially the received cells are reordered to the order in which they were received by the iMD 600. In other words, when iMD 600 performs the translation process described in reference to FIG. 19, eMD 700 untranslates the cell slot positions by the reverse of the process described in reference to FIG. 19. Similarly, when iMD 600 performs the translation process described in reference to FIG. 20, eMD 700 untranslates the cell slot positions by the reverse of the process described in reference to FIG. 20. This reordering by the eMD 700 allows cells destined for the same eFG 300 to be grouped together and then sent out to the appropriate eFG 300 from the eMD 700.

Note that the example of cell slot translation described in reference to FIGS. 19 and 18 are examples and alternative cell slot translations are possible. Such alternative cell slot translations can also re-associate cells initially associated with a particular input link of an iMD 600 to the various output links of that iMD 600. For example, the particular order of the columns within a translated frame need not be that specified in reference to FIGS. 19 and 20. Instead, the columns of the translated frame produced by iMDs 600 can be in any order as long as the reverse translation process performed by eMDs 700 is based on that alternative order. Similarly, the particular order of the rows within a translated frame need not be that specified in reference to FIGS. 19 and 20. Again, the row of the translated frame produced by iMDs 600 can be in any order as long as the reverse translation process performed by eMDs 700 is based on that alternative order.

The switching system thus far described relates to basic configuration having a throughput, for example, of 160 gigabit per second (Gb/s). This particular system configuration interconnects iFGs, GSs and eFGs components to form a switching fabric having a single physical stage (i.e., the stage of GSs) and a single logical switching stage (i.e., the stage of GSs).

Several alternative embodiments, however, are possible where the switching system can be scaled for greater connection rates based on a "pay-as-you-grow" modification scheme. In such a modified system configuration, the switch can have three physical stages while retaining a single logical switching stage. Such a configuration involves the use of the multiplexer/demultiplexer (MD) component referred to briefly in reference to FIG. 4. The MD configured component will be discussed in greater detail here followed by a discussion of the "pay-as-you-grow" modifications to scale the switching system to configurations with higher throughput rates.

The particular arrangements and interconnections of iFGs 100, iMDs 600, GSs 200, eMDs 700 and eFGs 300 can be varied to configure alternative embodiments in a manner known as "pay-as-you-grow". Thus, an embodiment having one particular architecture and an associated switching capability can be upgraded to alternative architectures having faster switching capabilities while incorporating the components of the previous configuration (i.e., the slower switching capability). Upgrading the switching capability can be done without having to discard initial components in the earlier embodiments but instead incorporate those components from the earlier embodiment into upgraded embodiments. Furthermore, upgrading the switching capability can be done while live traffic is passing through the switching system, as will be discussed in more detail below.

This "pay-as-you-grow" upgrade capability of the switching system is possible, at least in part, due to two characteristics of the system configuration. First, a physical chip (e.g., such as an ASIC) can include the components of a GS 200 and the components of an MD 600 (or 700) as described above in reference to FIGS. 4 and 6. These components can be activated and deactivated so that the same physical component can operate in one case as a GS 200 and in another case as an MD 600 (or 700). Second, the connections between the iMDs 600, the GSs 200 and the eMD 700 can be, for example, optical fiber that can be removably attached. Consequently, connections between MDs and GSs in one configuration of a system to be rearranged and reconnected in an alternative configuration of the system (e.g., having a higher throughput capability), while allowing the reuse of the MDs and GSs from the prior configuration. Said another way, the MDs and GSs from one configuration can be integrated into a new system configuration having additional MDs and GSs. This "pay-as-you-grow" capability can be further illustrated with respect to FIGS. 21 and 22.

Figure 21:
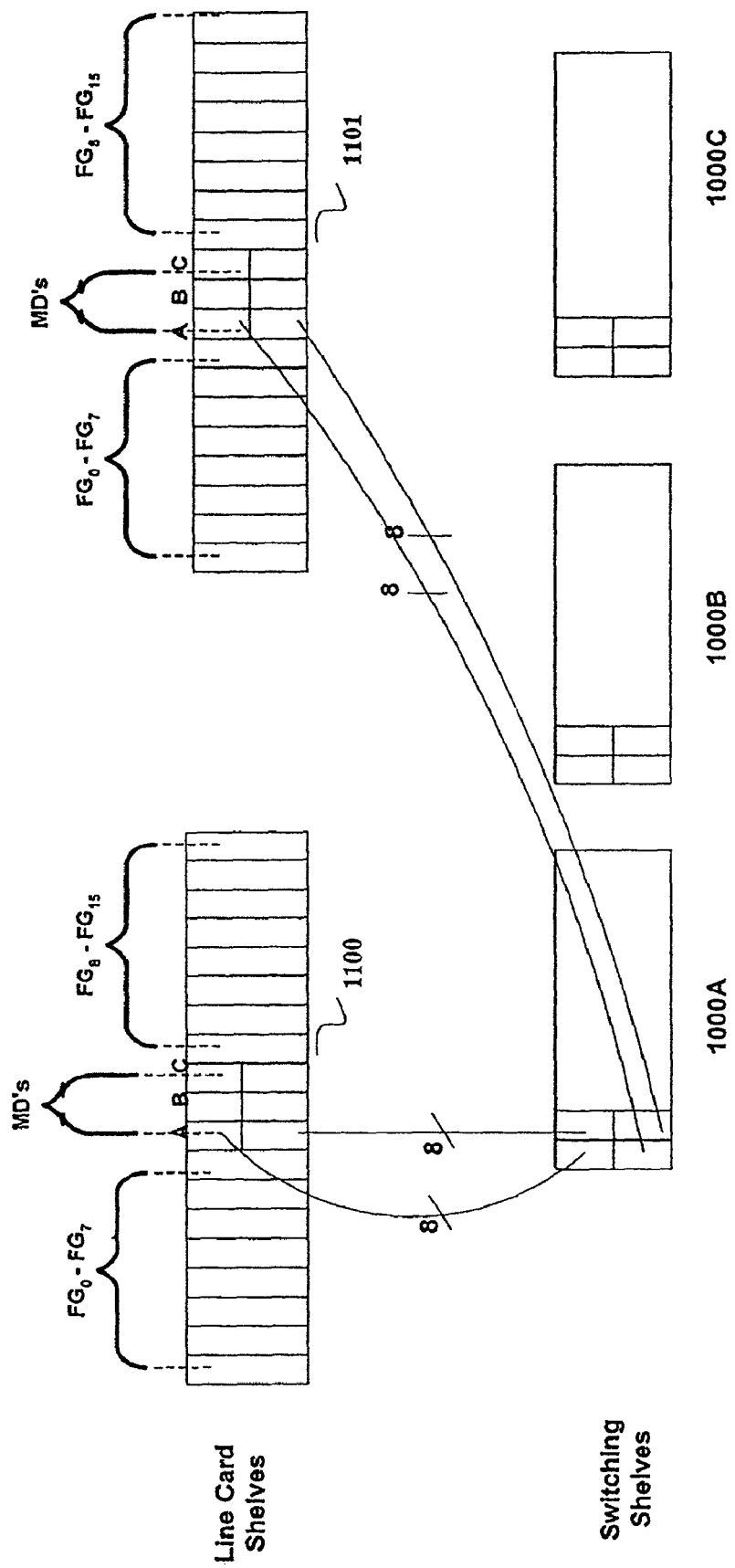
FIG. 21 illustrates a diagram showing the interconnections between line card shelves and switching shelves, according to an embodiment of present invention.

FIG. 21 illustrates a diagram showing the interconnections between line card shelves and switching shelves, according to an embodiment of present invention. The system illustrated in FIG. 21 corresponds to that shown in FIG. 5 (e.g., having a 320 Gb/s throughput). Although only a portion of the connections between the various components are shown in FIG. 21 for purposes of discussion and clarity, the remaining components shown in FIG. 21 are similarly connected as described below.

Line cards shelves 1100 and 1101 each include a set of line cards having the FGs (each line card having an iFG 100 and an eFG 300) and a set of MD cards having the MDs (each MD card having a group of iMDs 600 and a group of eMDs 700). In the embodiment shown in FIG. 21, each line card shelf has nineteen cards: sixteen line cards having an iFG 100 and an eFG 300 each, and three MD cards each having four iMDs 600 and four eMDs 700. The switching shelves 1000A, 1000B and 1000C each include switching cards each having a group of GSs 200 (e.g., each switching card having four GSs 200). The switching shelves 1000A, 1000B and 1000C can have slots for more switching cards than may be used for a particular configuration(s).

The iFGs 100 for a particular line card shelf can be connected to the iMDs 600 by a shelf back plane so that, for example, each iFG 100 is connected to each iMD 600 for a particular line card shelf. Each iFG 100 can include, for example, twelve output links, 0 through 11. Each iMD 600 can include, for example, sixteen input links, 0 through 15. Each output link of an iFG 100 can be connected to a different iMD 600. For example, each iFG 100 can be connected to each iMD 600 in a manner where the output link number of an iFG 100 corresponds to the iMD-identifying number (e.g., output link 0 of iFGs 100 are connected to $iMD_0$ for a particular line card shelf).

Said another way, the iMDs 600 and the eMDs 700 can be grouped in three sets (e.g., referred herein as planes A, B and C) of four iMDs 600 and four eMDs 700. Thus, the output links 0 through 3 for each iFG 100 (within a particular line card shelf) connect to plane A (i.e., the input links of the four iMDs 600 in plane A), the output links 4 through 7 for each iFG 100 connect to plane B, and the output links 8 through 11 for each iFG 100 connect to plane C.

The grouping of the iMDs 600 and eMDs 700 into planes allows the switching system to be upgraded or maintained while still allowing live traffic to pass through the switching system. In other words, the switching system need not be made temporarily inoperative to perform such upgrades or maintenance. Rather, a single plane can be temporarily disabled for repair or for reconfiguring the interconnections associated with that plane (for the purpose of upgrading the switching system), while the other two planes remain operational.

Following the labeling of FIG. 21, $iMD_0$ through $iMD_3$ 600 can be located on MD plane A, $iMD_4$ through $iMD_7$ 600 can be located on MD plane B and $iMD_8$ through $iMD_{11}$ 600 can be located MD plane C. Thus, the output links 0 of $iFG_0$ through $iFG_{15}$ 100 are connected to the input links 0 through 15 of an $iMD_0$ 600 in MD plane A. Accordingly, the remaining output links 2 through 15 of $iFG_0$ through $iFG_{15}$ 100 are connected to the corresponding input links 2 through 15 of $iMD_1$ through $iMD_{11}$ 600 (in MD planes A, B and C).

The eMDs 700 can be similarly connected to eFGs 300. Similar to iMDs 600, $eMD_0$ through $iMD_3$ 700 can be located on MD plane A, $eMD_4$ through $eMD_7$ 700 can be located on MD plane B and $eMD_8$ through $eMD_{11}$ 700 can be located MD plane C. The output links 0 of $eFG_0$ through $eFG_{15}$ 300 can be connected to the input links 0 through 15 of $eMD_0$ 700 in MD plane A. Accordingly, the remaining output links 2 through 15 of $eFG_0$ through $eFG_{15}$ 300 are connected to the corresponding input links 2 through 15 of $eMD_1$ through $eMD_{11}$ 700 (in MD planes A, B and C).

The iMDs 600 and the eMDs 700 in the line card shelves 1100 and 1101 are connected to the GSs 200 in the switching shelves 1000A, 1000B and 100C so that each iMD 600 and eMD 700 from plane A (for all of the line card shelves, e.g., 1100 and 1101) is connected to the GSs 200 in the switching shelf 1000A; each iMD 600 and eMD 700 from plane B (for all of the line card shelves) is connected to the GSs 200 in the switching shelf 1000B; and each iMD 600 and eMD 700 from plane C (for all of the line card shelves) is connected to the GSs 200 in switching shelf 1000C.

The connections between the line card shelves and the switching card shelves can be, for example, optical fibers that support transfer rates of 10 Gb/s. Using such an optical fiber, each optical fiber can support, for example, four 2.5 Gb/s links. For example, where the iMDs 600 and the eMDs 700 have 2.5 Gb/s output links to or input links from GSs 200, respectively, an optical fiber can support four links: links 0 through 3 can share an optical fiber, links 4 through 7 can share an optical fiber, links 8 through 11 can share an optical fiber and links 12 through 15 can share an optical fiber.

Thus, for a particular MD plane, the four iMDs 600 can be connected to the GSs 200 in switching shelf for plane A (e.g., switching shelf 1000A) by sixteen connections. For the particular embodiment shown in FIG. 21, the four iMDs 600 in plane A of line card shelf 1100 are connected by eight optical fibers to four GSs 200 on a switching shelf card on 1000A and are connected by another eight optical fibers to another four GSs 200 on another switching card on 1000A. Similarly, four iMDs 600 in plane A of line card shelf 1101 are connected by eight optical fibers to the four GSs 200 within the first switching shelf card on 1000A and are connected by another eight optical fibers to the four GSs 200 on the other switching card 1000A. The iMDs 600 in plane B of line card shelves 1100 and 1101 are similarly connected (not shown in FIG. 21) to the GSs 200 on switching shelf 1000B. The iMDs 600 in plane C of line card shelves 1100 and 1101 are similarly connected (not shown in FIG. 21) to the GSs 200 on switching shelf 1000C. The eMDs 700 are similarly connected (not shown in FIG. 19) to the GSs 200.

Returning to FIG. 5, the illustrated portion of the switching fabric can now be explained in reference to the connections described in reference to FIG. 21. The two sets of iFGs 100 (and the two sets of corresponding eFGs 300) are located on line cards in line card shelves 1100 and 1101, respectively. The iMDs 600 and the eMIDs 700 shown in FIG. 5 are the MDs for plane B and are located in the MD plane B on line card shelves 1100 and 1101, respectively. The connections between iFGs 100 and the iMDs 600 shown in FIG. 5 are for output links 4 through 7 of $iFG_5$ to the input link 5 of the iMDs 600 in plane B.

The iMDs 600 in plane B of the line card shelves 1100 and 1101 are connected to GSs 200 in switching shelf 1000B. Output links 0 through 7 of the first iMD 600 in line card shelf 1100 are connected to input link 0 of the four GSs 200 in the first switching card of 1000B and the four GSs 200 in the second switching card of 1000B. Output links 0 through 7 of the first iMD 600 in line card shelf 1101 are connected to input link 1 of the four GSs 200 in the first switching card of 1000B and the four GSs 200 in the second switching card of 1000B. Output links 8 through 15 of the first iMD 600 in line card shelf 1100 are connected to input link 2 of the four GSs 200 in the first switching card of 1000B and the four GSs 200 in the second switching card of 1000B. Output links 8 through 15 of the first iMD 600 in line card shelf 1101 are connected to input link 3 of the four GSs 200 in the first switching card of 1000B and the four GSs 200 in the second switching card of 1000B. The remaining iMDs 600 within plane B are similarly connected to the GSs 200, and planes A and C are similarly connected. The eMDs 700 and the GSs 200 are also similarly connected for planes A, B and C.

Figure 22:
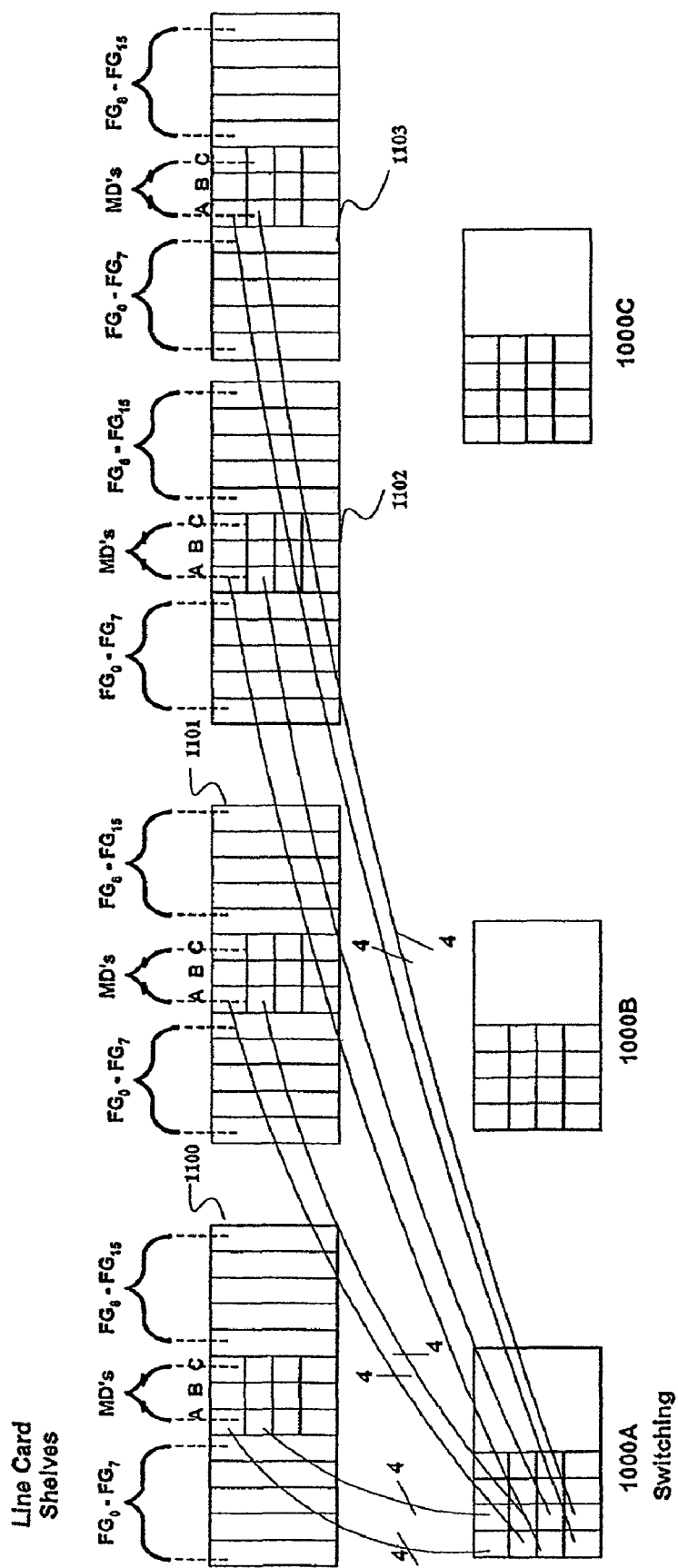
FIG. 22 illustrates a diagram showing the interconnections between line card shelves and switching shelves, according to another embodiment of present invention.

FIG. 22 illustrates a diagram showing the interconnections between line card shelves and switching shelves, according to another embodiment of present invention. The system illustrated in FIG. 22 can have a throughput of, for example, 640 Gb/s. Again, although only a portion of the connections between the various components are shown in FIG. 22 for purposes of discussion and clarity, the remaining components shown in FIG. 22 are similarly connected.

Note that the configuration shown in FIG. 22 can configured as an upgrade from the configuration shown in FIG. 21. In such a case, the configuration shown in FIG. 21 can be upgraded by temporarily disabling each plane and reconfiguring the interconnections associated with that plane, while the other two planes to remain operational. By such a process, the configuration shown in FIG. 21 can have additional components added and its interconnections reconnected plane-by-plane to result in the configuration shown in FIG. 22, all while allowing the switching system to remain operational.

In addition to the line card shelves 1100 and 1101, and the switching shelves 1000A, 1000B and 1000C of FIG. 21, the example illustrated by FIG. 22 also includes additional line card shelves 1102 and 1103 (each having their own associated line cards and MD cards), and the additional switching cards within switching shelves 1000A, 1000B and 1000C. In this embodiment, each iMDs 600 for a particular plane (e.g., plane A, B or C for line card shelves 1100 through 1103) has one optical fiber connection (associated with four input links) to each switching card (e.g., having four GSs 200) within the corresponding plane. For a specific example, the iMDs 600 for plane A in line card shelf 1100 has four optical fiber connections to each GS card in the switching shelf 1000A. Similarly, the iMDs 600 for plane A in line card shelves 1101, 1002 and 1103 each have four optical fiber connections to each GS card in the switching shelf 1000A. The iMDs 600 for planes B and C are similarly connected to the GSs 200 in the switching shelves B and C, respectively. The eMDs 700 and the GSs 200 are also similarly connected for planes A, B and C.

Figure 23:
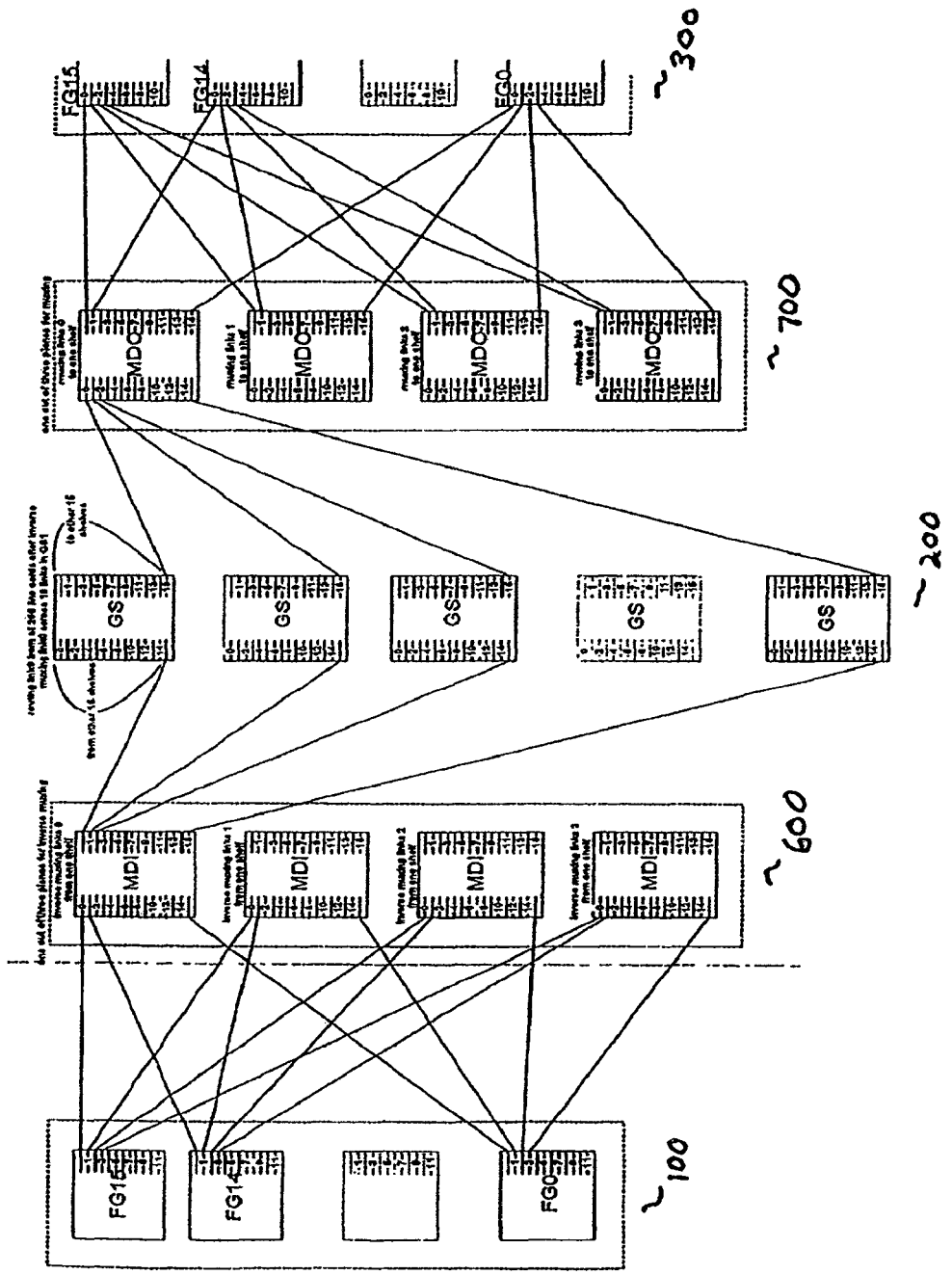
FIG. 23 illustrates a system block diagram of a portion of a switch, according to yet another alternative embodiment of the present invention.

FIG. 23 illustrates a system block diagram of a portion of a switch, according to yet another alternative embodiment of the present invention. The switching fabric illustrated in FIG. 23 has a higher throughput than that of the switch fabric discussed in reference to FIGS. 1 and 5. For example, the portion of the switch fabrics shown in FIGS. 1 and 5 can have, for example, 160 Gb/s and 320 Gb/s throughputs, respectively, while the portion of the switch fabric shown in FIG. 23 can have, for example, a 2.56 Tb/s throughput. The iFGs 100 (and associated eFGs 300) shown in FIG. 23 represent the iFGs 100 (and associated eFGs 300) of one line card shelf from a total sixteen line card shelves for this embodiment. The iMDs 600 (and associated eMDs 700) shown in FIG. 23 represent the iMDs 600 for one plane of one line card shelf from a total of three planes for that line card shelf (again, for one line card shelf from a total of sixteen line card shelves). The iMDs 600 (and the associated eMDs 700) are connected to the GSs 200 within the three switching shelves.

In this embodiment with the sixteen line card shelves and the three switching shelves, the switching fabric has 256 iFGs 100, 192 iMDs 600, 192 GSs 200, 192 eMDs 700 and 256 eFGs 300. The 192 iMDs 600 (and their associated eMDs 700) are connected to the 192 GSs by 768 optical fibers where each optical fiber, for example supporting a transfer rate of 10 Gb/s, carries four 2.5 Gb/s links between the MDs and GSs.

Figure 24:
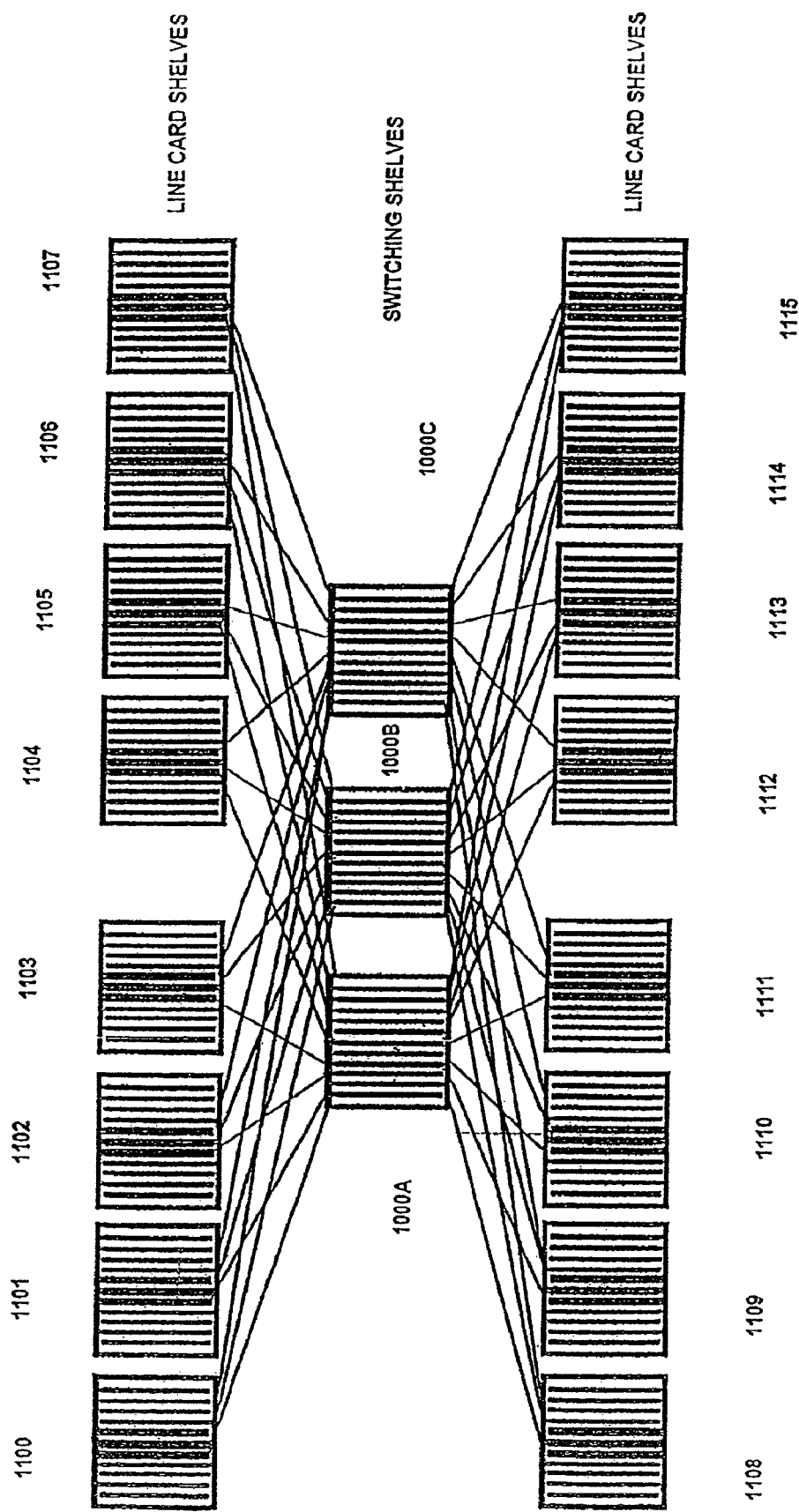
FIG. 24 illustrates a diagram showing the interconnections between line card shelves and switching shelves, according to the embodiment illustrated in FIG. 21.

FIG. 24 illustrates a diagram showing the interconnections between line card shelves and switching shelves, according to the embodiment illustrated in FIG. 23. The sixteen line card shelves 1100 through 1115 are connected to the three switching shelves 1000A, 1000B and 1000C. FIG. 24 graphically represents a connection between each line card shelf 1100 through 1115 and each switching shelf 1000A, 1000B and 1000C, where each connection represents sixteen 10 Gb/s optical fiber connections.

The switch fabric configuration shown in FIG. 1 (e.g., having a 160 Gb/s throughput) can be scaled through several intermediate configurations to the switch fabric configuration shown in FIG. 24 (e.g., having a 2.56 Tb/s throughput). Table 1 summarizes the number of line card shelves, the number of switching shelves and the number of GS cards per switching shelf (where each GS card has four GSs 200). Note that the configuration having a 160 Gb/s throughput has the three GS cards located in the three slots in the line card shelf that is used for the MDs for configurations with higher throughput. In these configurations having higher throughput, the GS cards are located in the switching shelves.

TABLE 1

| Throughput (Gb/s) | # of Line Card Shelves | # of Switching Shelves | # of GS cards per Switching Shelves |
| --- | --- | --- | --- |
| 160 | 1 | 0 | 1 GS set on the line card shelf |
| 320 | 2 | 3 | 2 |
| 640 | 4 | 3 | 4 |
| 1280 | 8 | 3 | 8 |
| 2560 | 16 | 3 | 16 |

Table 2 summarizes the number of iFGs 100, eFGs 300, GSs 200, iMDs 600 and eMDs 700 for each configuration. Note, again, that as a configuration is scaled to a configuration having a higher throughput, the iFGs 100, eFGs 300, GSs 200 and/or the iMDs 600 and eMDs 700 from a previous (and lower throughput) configuration are still used with additional components, the "pay as you grow" manner described above.

TABLE 2

| Throughput (Gb/s) | # of iFGs | # of eFGs | # of GSs | # of iMDs | # of eMDs |
| --- | --- | --- | --- | --- | --- |
| 160 | 16 | 16 | 12 | 0 | 0 |
| 320 | 32 | 32 | 24 | 24 | 24 |
| 640 | 64 | 64 | 48 | 48 | 48 |
| 1280 | 128 | 128 | 96 | 96 | 96 |
| 2560 | 256 | 256 | 192 | 192 | 192 |

The system configuration having, for example, a throughput of 2.56 Tb/s further illustrates examples of the differences between the physical connections and the logical connections of the switching fabric. In this configuration, each iFG 100 sends cells (including associated RTSs) to every GS 200 of the 192 GSs 200 via the 192 iMDs 600. Thus, a given iFG 100 is connected physically to the stage of GSs 200 by a set of iMDs 600, each of which is connected to GSs 200 by twelve 2.5 Gb/s links (e.g., by a optical fiber supporting 10 Gb/s transport for four 2.5 Gb/s link). This physical connection, however, differs from the effective logical connections between the iFGs 100 and the single switching-stage of GSs 200 (i.e., the single logical stage, which excludes the stages of iMDs 600 and eMDs 700 which do not perform arbitration). Because the iFGs 100 are logically connected to every GS 200 in the single logical stage of GSs 200 by the 192 iMDs, the iFGs 100 are logically connected to the 192 GSs by 192 156.25 Mb/s links. Said another way, although each GS 200 only has twelve 2.5 Gb/s physical connections (to twelve iMDs 600), each GS 200 receives cells from all of the 256 iFGs 100 over the course of a single frame.

Thus, although the overall switching fabric has, for example, a throughput of 2.56 Tb/s, the single logical stage of GSs 200 can perform the various switching functions (e.g., arbitration) at 156.25 Mb/s. In general, the data path and the control path of the switching fabric can both operate at a similar rate while still allowing the overall switching fabric to have a higher throughput. For example, the embodiment of the switching fabric having a throughput of 2.56 Tb/s can have a data path and control path operating at a lower rate, for example, at 156.25 Mb/s. Note that this switch fabric is unlike known switch fabrics (e.g., having a centralized scheduler with bit-sliced data paths) where the control path has a rate similar to the overall switching fabric throughput, which typically makes implementation more difficult.

Note that the stage of iMDs 600 provides a degree of fault tolerance due to the fact that received cells (and associated RTSs) are sent to arbitrary GSs 200. More specifically, RTSs generated by the iFGs 100 are randomized and sent to connected iMDs 600. These RTSs are sent from the iMDs 600 to any of the connected GSs 200. Thus, a RTS, for example, can be sent to a GS 200 through a random path from the iFG 100 to a random iMD 600 to a random GS 200. In the case where a fault occurs, for example, a brake in the optical fiber connecting an iMD 600 to a GS 200, the RTS will not reach the GS 200 for arbitration and, thus, a corresponding CTS will not issue (and, thus, preventing the corresponding data payload to be sent from the iFG 100).

In such a failure, the iFG 100 and the GS 200 will time out the RTS (e.g., will determine that no CTS has been received within a certain time period) and conclude that a fault has occurred. At that time, the iFG 100 can generate a duplicate RTS for that particular data payload and send that duplicate RTS. Because the duplicate RTS will again be sent over a random (and presumably different) path, the RTS will reach a GS 200 and be properly processed for arbitration, etc.

Although the present invention has been discussed above in reference to examples of embodiments and processes, other embodiments and/or processes are possible. For example, although various embodiments have been described herein in reference to a particular number of components (e.g., iFGs, iMDs, GSs, eMDs and eFGs) each having a particular number input links and output links, other embodiments are possible having a different number of components with a different number of input links and output links. Similarly, although various embodiments have been described herein in reference to particular throughputs (e.g., 160 Gb/s and 2.56 Tb/s), particular connection characteristics (e.g., optical fibers support transfer rates of 10 Gb/s), and particular frame structures (e.g., a sixteen by sixteen cell frame), other embodiments are possible having different throughputs, different connections characteristics and frame structures.

What is claimed is:

1. An apparatus for transferring data, comprising:
a plurality of switches, each comprising:
   a scheduler arranged to examine request-to-sends (RTSs) received by the switch, and to determine which of plural sources of data will be allowed to send data to at least one destination for a given time slot, by grouping together the RTSs for each source and arbitrating each grouping of RTSs, and
   an assembler arranged to assemble data provided from at least one of the sources, into data packets based on a determination made by the scheduler, and to forward assembled data packets to the at least one destination.

2. The apparatus of claim 1, wherein the scheduler determines which of plural sources will be allowed to send data by creating a mapping of which inputs will be routed to which outputs.

3. The apparatus of claim 1, wherein the scheduler determines which of the plural sources will be allowed to send data based on a round-robin methodology.

4. The apparatus of claim 1, further comprising a cell parser arranged to parse RTSs from data, and to forward the parsed RTSs towards the scheduler and the data towards the assembler.

5. The apparatus of claim 1, wherein data flow is effected in a predetermined order across the plurality of switches.

6. A method for transferring data, comprising:
examining request-to-sends (RTSs) to determine which of plural sources of data will be allowed to send data to at least one destination for a given time slot, by grouping together the RTSs for each source and arbitrating each grouping of RTSs;
assembling data provided from at least one of the sources, into data packets based on a determination result obtained in the examining; and
forwarding assembled data packets to the at least one destination.

7. The method of claim 6, wherein determination of which of the plural sources will be allowed to send data is performed by creating a mapping of which inputs will be routed to which outputs.

8. The method of claim 6, wherein determination of which of the plural sources will be allowed to send data is performed based on a round-robin methodology.

9. The method of claim 6, further comprising parsing RTSs from data.

10. The method of claim 8, further comprising buffering the assembled data packets until a data packet has been received for every one of a plurality of packet framer outputs.

11. The apparatus of claim 1, further comprising a cell parser, arranged to parse cells into RTS, grant, flow control, and data payload portions, and to provide RTSs to the scheduler.

12. The apparatus of claim 1, wherein the scheduler performs RTS grouping, RTS arbitration and RTS time out.

13. The apparatus of claim 11, wherein the assembler reassembles cells from the data payload portions based on flow control information provided by the cell parser and the determination made by the scheduler.

14. The apparatus of claim 11, further comprising a deskew FIFO arranged to align cells by buffering them, and to provide the cells to the cell parser in time alignment.

15. The apparatus of claim 13, further comprising a time slot engine that buffers reassembled cells and provides them to cell framer outputs, wherein the time slot engine buffers reassembled cells until a cell for every cell framer output is received.

16. The method of claim 6, wherein the examining includes performing RTS grouping, RTS arbitration and RTS time out.

17. The method of claim 6, further comprising parsing cells into RTS, grant, flow control, and data payload portions, and providing RTSs for the examining.

18. The method of claim 17, wherein the assembling includes reassembling cells from the data payload portions based on flow control information provided by the cell parser and the result of the examining.

19. The method of claim 17, further comprising aligning cells by buffering them, and providing the cells in time alignment, for being parsed.

20. The method of claim 18, further comprising buffering reassembled cells and providing them to cell framer outputs, wherein the buffering buffers reassembled cells until a cell for every cell framer output is received.

21. The method of claim 6, further comprising:
accepting data cells, including data from at least one of the plural sources of data, temporally offset from one another at a memory;
compensating for discrepancies between times at which the data cells are accepted at the memory; and
after all of the data cells are accepted at the memory, forwarding the data cells in a non-temporally offset manner such that the discrepancies between the times are removed.

22. The method of claim 21, wherein the memory is a deskew FIFO.

23. The method of claim 21, wherein the compensating includes buffering at least one of the data cells.

24. The method of claim 21, further comprising:
determining whether connections between at least one framer and the memory are non-operational by keeping track of a time-out period.

25. The method of claim 24, further comprising:
inserting at least one idle cell for a connection determined to be non-operational.

26. The method of claim 24, wherein the data cells are provided from the at least one framer at different clock timings.

27. The method of claim 21, further comprising:
periodically instructing at least one of the plural sources to send additional data cells to the memory.

28. The apparatus of claim 1, wherein each of the plurality of switches further comprises:
a memory, arranged to
   (a) accept data cells, including data from at least one of the plural sources of data, temporally offset from one another,
   (b) compensate for discrepancies between times at which the data cells are accepted at the memory, and (c) after all of the data cells are accepted at the memory, forward the data cells in a non-temporally offset manner such that the discrepancies between the times are removed.

29. The apparatus of claim 28, wherein the memory is a deskew FIFO.

30. The apparatus of claim 28, wherein the at least one of the plural data sources includes one of at least one framer and at least one fabric gateway.

* * * * *

UNITED STATES PATENT AND TRADEMARK OFFICE
CERTIFICATE OF CORRECTION

| | |
|---|---|
| PATENT NO. | : 8,165,112 B2 |
| APPLICATION NO. | : 12/368064 |
| DATED | : April 24, 2012 |
| INVENTOR(S) | : Raghavan Menon et al. |

It is certified that error appears in the above-identified patent and that said Letters Patent is hereby corrected as shown below:

COLUMN 1:

Line 15, "exists" should be deleted.

COLUMN 2:

Line 40, "of" should read --of the--; and
Line 43, "of" should read --of the--.

COLUMN 3:

Line 38, "RTS" should read --RTSs--; and
Line 56, "face," should read --fact,--.

COLUMN 9:

Line 12, "is" (2$^{nd}$ occurrence) should read --its--; and
Line 29, "exceeds" should read --exceed--.

COLUMN 10:

Line 3, "Co)" should read --$C_0$)--.

COLUMN 11:

Line 41, "inputs 210," should read --input$_0$ 210,--; and
Line 60, "components" should read --component--.

Signed and Sealed this
Fourteenth Day of August, 2012

David J. Kappos
*Director of the United States Patent and Trademark Office*

COLUMN 13:

Line 20, "results" should read --result--; and
Line 39, "Taken" should read --Taking--.

COLUMN 14:

Line 18, "complete" should read --to complete--.

COLUMN 16:

Line 67, "result" should read --results--.

COLUMN 18:

Line 1, "can" should read --can have--;
Line 3, "in" should read --is--; and
Line 15, "the" (1st occurrence) should be deleted.

COLUMN 20:

Line 17, "GSs200" should read --GSs 200--.

COLUMN 23:

Line 4, "located" should read --located on--;
Line 14, "located" should read --located on--; and
Line 23, "100C" should read --1000C--.

COLUMN 25:

Line 58, "components," should read --components, in--.

COLUMN 26:

Line 52, "brake" should read --break--.

COLUMN 27:

Line 3, "number" should read --number of--.